US009804679B2

(12) United States Patent
Carceroni et al.

(10) Patent No.: US 9,804,679 B2
(45) Date of Patent: Oct. 31, 2017

(54) TOUCHLESS USER INTERFACE NAVIGATION USING GESTURES

(71) Applicant: Google Inc., Mountain View, CA (US)

(72) Inventors: Rodrigo Lima Carceroni, Mountain View, CA (US); Pannag R. Sanketi, Fremont, CA (US); Suril Shah, Mountain View, CA (US); Derya Ozkan, Mountain View, CA (US); Soroosh Mariooryad, San Jose, CA (US); Seyed Mojtaba Seyedhosseini Tarzjani, Sunnyvale, CA (US); Brett Lider, San Francisco, CA (US); Peter Wilhelm Ludwig, San Francisco, CA (US)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 14/791,291

(22) Filed: Jul. 3, 2015

(65) Prior Publication Data
US 2017/0003747 A1 Jan. 5, 2017

(51) Int. Cl.
G06F 3/01 (2006.01)
G06F 3/03 (2006.01)
(Continued)

(52) U.S. Cl.
CPC ............. G06F 3/017 (2013.01); G04C 3/002 (2013.01); G06F 1/163 (2013.01); G06F 1/1694 (2013.01);
(Continued)

(58) Field of Classification Search
CPC ................................ G06F 3/017; G06F 3/0482
See application file for complete search history.

(56) References Cited

U.S. PATENT DOCUMENTS 6,151,208 A 11/2000 Bartlett
6,874,127 B2 3/2005 Newell et al.
(Continued)

FOREIGN PATENT DOCUMENTS

EP 2876534 A1 5/2008
EP 2079004 A1 7/2009
(Continued)

OTHER PUBLICATIONS

Koo et al, Machine Translation of Foreign Patent Document KR 20150082079 A, Apparatus and method for controlling home device using wearable device, Jul. 15, 2015, pp. 1-13.*

(Continued)

Primary Examiner — Patrick Edouard
Assistant Examiner — Maheen Javed
(74) Attorney, Agent, or Firm — Shumaker & Sieffert, P.A.

(57) ABSTRACT

An example method includes displaying, by a display (104) of a wearable device (100), a content card (114B); receiving, by the wearable device, motion data generated by a motion sensor (102) of the wearable device that represents motion of a forearm of a user of the wearable device; responsive to determining, based on the motion data, that the user has performed a movement that includes a supination of the forearm followed by a pronation of the forearm at an acceleration that is less than an acceleration of the supination, displaying, by the display, a next content card (114C); and responsive to determining, based on the motion data, that the user has performed a movement that includes a supination of the forearm followed by a pronation of the forearm at an acceleration that is greater than an acceleration of the supination, displaying, by the display, a previous content card (114A).

19 Claims, 13 Drawing Sheets

(51) Int. Cl.
| | |
|---|---|
| *G06F 3/0482* | (2013.01) |
| *G04C 3/00* | (2006.01) |
| *G06F 1/16* | (2006.01) |
| *G06F 3/0485* | (2013.01) |
| *H04M 1/725* | (2006.01) |

(52) U.S. Cl.
CPC .............. *G06F 3/03* (2013.01); *G06F 3/0482* (2013.01); *G06F 3/0485* (2013.01); *G06F 2200/1637* (2013.01); *H04M 1/72569* (2013.01)

(56) References Cited

U.S. PATENT DOCUMENTS

| | | | |
|---|---|---|---|
| 7,180,502 B2 | 2/2007 | Marvit et al. | |
| 7,184,025 B2 | 2/2007 | Williams et al. | |
| 8,280,732 B2 | 10/2012 | Richter et al. | |
| 8,344,998 B2 | 1/2013 | Fitzgerald et al. | |
| 8,515,505 B1 | 8/2013 | Pattikonda | |
| 8,701,032 B1 | 4/2014 | Zhai et al. | |
| 8,784,271 B2 | 7/2014 | Brumback et al. | |
| 8,819,569 B2 | 8/2014 | SanGiovanni et al. | |
| 8,896,526 B1* | 11/2014 | Park | G04C 3/002 345/156 |
| 9,009,516 B1 | 4/2015 | Gabayan et al. | |
| 9,678,658 B2* | 6/2017 | Zhang | G06F 3/0488 |
| 2008/0174547 A1* | 7/2008 | Kanevsky | G06F 3/017 345/156 |
| 2008/0192005 A1 | 8/2008 | Elgoyhen et al. | |
| 2008/0255795 A1 | 10/2008 | Shkolnikov | |
| 2008/0291160 A1 | 11/2008 | Rabin | |
| 2009/0195497 A1 | 8/2009 | Fitzgerald et al. | |
| 2009/0265671 A1 | 10/2009 | Sachs et al. | |
| 2009/0303204 A1 | 12/2009 | Nasiri et al. | |
| 2010/0124949 A1* | 5/2010 | Demuynck | G06F 1/1626 455/569.1 |
| 2010/0138785 A1 | 6/2010 | Uoi et al. | |
| 2010/0235667 A1 | 9/2010 | Mucignat et al. | |
| 2011/0054833 A1 | 3/2011 | Mucignat | |
| 2011/0177802 A1 | 7/2011 | Gupta | |
| 2012/0235906 A1* | 9/2012 | Ryoo | G06F 3/017 345/158 |
| 2012/0254646 A1 | 10/2012 | Lin | |
| 2012/0272194 A1 | 10/2012 | Yang et al. | |
| 2012/0297226 A1 | 11/2012 | Mucignat et al. | |
| 2013/0222270 A1 | 8/2013 | Winkler et al. | |
| 2013/0222271 A1 | 8/2013 | Alberth et al. | |
| 2013/0234924 A1 | 9/2013 | Janefalkar et al. | |
| 2013/0249785 A1 | 9/2013 | Alameh | |
| 2013/0265218 A1 | 10/2013 | Moscarillo | |
| 2013/0300687 A1 | 11/2013 | Park | |
| 2014/0071037 A1 | 3/2014 | Cohen et al. | |
| 2014/0139422 A1* | 5/2014 | Mistry | G06F 3/014 345/156 |
| 2014/0139454 A1 | 5/2014 | Mistry et al. | |
| 2014/0143737 A1 | 5/2014 | Mistry et al. | |
| 2014/0191955 A1 | 7/2014 | Raffa et al. | |
| 2014/0253429 A1 | 9/2014 | Dai et al. | |
| 2014/0282270 A1 | 9/2014 | Slonneger | |
| 2015/0085621 A1* | 3/2015 | Hong | G04G 21/00 368/10 |
| 2015/0101423 A1* | 4/2015 | Tuli | G01P 13/00 73/865.4 |
| 2015/0121228 A1* | 4/2015 | Lee | H04L 67/025 715/727 |
| 2016/0041620 A1* | 2/2016 | Motoyama | G06F 3/017 345/156 |
| 2016/0041680 A1* | 2/2016 | Chi | H04B 1/385 345/173 |
| 2016/0048161 A1 | 2/2016 | Carceroni et al. | |
| 2016/0085266 A1* | 3/2016 | Lee | H04N 5/2628 348/240.2 |
| 2016/0202665 A1* | 7/2016 | Park | G04C 3/002 368/225 |
| 2016/0299570 A1* | 10/2016 | Davydov | G06F 1/163 |
| 2016/0320849 A1* | 11/2016 | Koo | G06F 3/017 |

FOREIGN PATENT DOCUMENTS

| | | | | |
|---|---|---|---|---|
| EP | 2499552 A1 | 9/2012 | | |
| GB | 2419433 A | 4/2006 | | |
| KR | 20150082079 A | * 7/2015 | ............. | G06F 3/017 |
| WO | 2015060856 A1 | 4/2015 | | |
| WO | WO 2015060856 A1 | * 4/2015 | ............. | G06F 1/163 |

OTHER PUBLICATIONS

Introducing the Meteor Your Voice and Gesture-Controlled Smartwatch, Two-Way Voice & Gesture Control Communicator, Kreyos—The Meteor smart watch, downloaded from https:l/kreyos.com/, downloaded on Jun. 3, 2014, 8 pp.

Wikipedia, "Correlation and Dependance," http://en.wikipedia.org/wiki/Correlation_and_dependence#Pearson.27s_product-moment_coefficient, accessed Mar. 13, 2013, 8 pp.

Wikipedia, "Covariance," http://en.wikipedia.org/wiki/Covariance, accessed Mar. 13, 2013, 6 pp.

Wikipedia, "Pearson Product-Moment Correlation Coefficient," http://en.wikipedia.org/wiki/Pearson_product-moment_correlation_coefficient, accessed Mar. 13, 2013, 13 pp.

International Search Report and Written Opinion of International Application No. PCT/US2016/039725, dated Sep. 6, 2016, 14 pp.

Will Shanklin, "Review: Pebble smartwatch," Gizmag's YouTube Channel, Retrieved from <www.gizmag.com/pebble-watch-review/28990/> Sep. 8, 2013, 11 pp.

Jon Fingas, "Android Wear will reportedly let you navigate with a flick of the wrist," Engadget, Retrieved from <http://www.engadget.com/2015/03/10/androidweargestureandwifileak/> Mar. 10, 2015, 19 pp.

Dhiram Shah, "Casio G-Shock with High Brightness LED automatically illuminates the display when the user tilts the watch toward the eyes to check the time," Fareastgizms, Retrieved from <fareastgizmos.com/other_stuff/casio_gshock_with_high_brightness_led_automatically_illuminates_the_display_when_the_user_tilts_the_watch_toward_the_eye.php> Aug. 23, 2010, 3 pp.

Kreyos, "Introducing Meteor, Two-Way Voice & Gesture Control Communicator—Your Phone in Your Pocket," Retrieved from <www.kreyos.com/?utm_source=indiegogo&utm_medium=web&utm_campaign=igg> Jan. 7, 2014, 8 pp.

U.S. Appl. No. 14/826,437 filed by Rodrigo Carceroni on Aug. 14, 2015.

* cited by examiner

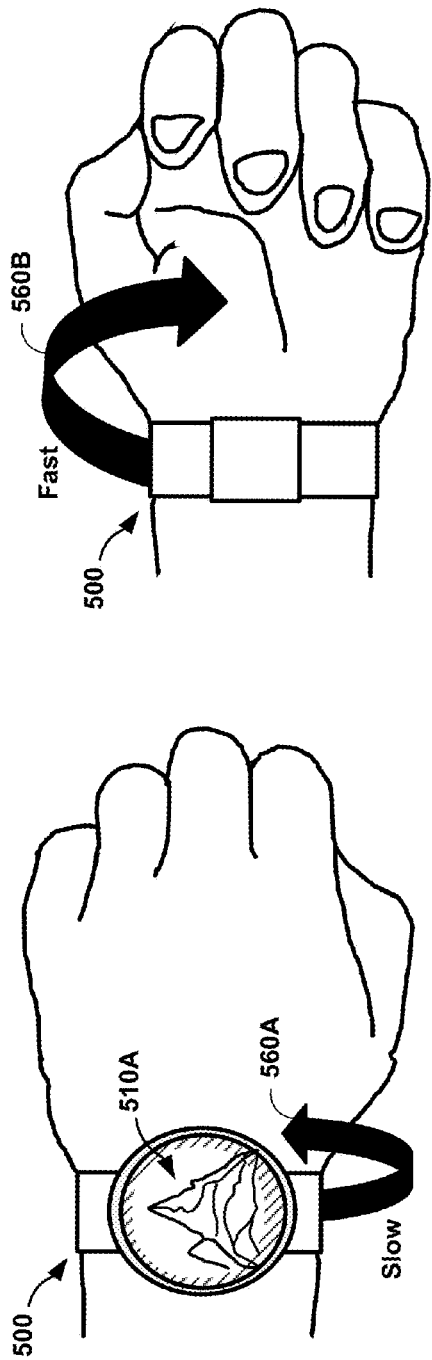
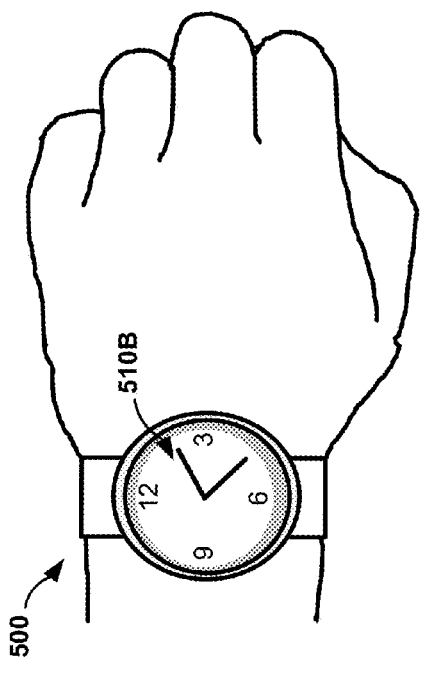
FIG. 5A  FIG. 5B  FIG. 5C

TOUCHLESS USER INTERFACE NAVIGATION USING GESTURES

BACKGROUND

Some wearable computing devices (e.g., smart watches, activity trackers, heads-up display devices, etc.) output graphical content for display. For example, a wearable computing device may present a graphical user interface (GUI) including one or more graphical elements that contain information. As a user interacts with a GUI that contains visual indications of content, the wearable computing device may receive input (e.g., speech input, touch input, etc.). However, when interacting with the GUI, it may be difficult for a user to provide speech input, touch input, or other conventional types of input that may require a user to focus and/or exhibit precise control. For example, the user may be immersed in activity (e.g., having a face-to-face conversation, riding a bicycle, etc.) or attending an event (e.g., a concert, a movie, a meeting, an educational class, etc.) that prevents a user from speaking voice-commands into a microphone or providing specific touch inputs at a screen.

BRIEF DESCRIPTION OF DRAWINGS

The details of one or more examples of the disclosure are set forth in the accompanying drawings and the description below. Other features, objects, and advantages will be apparent from the description and drawings, and from the claims.

FIGS. 4A through 7C are conceptual diagrams illustrating example movements of an example wearable computing device, in accordance with one or more aspects of the present disclosure.

DETAILED DESCRIPTION

Figure 1:
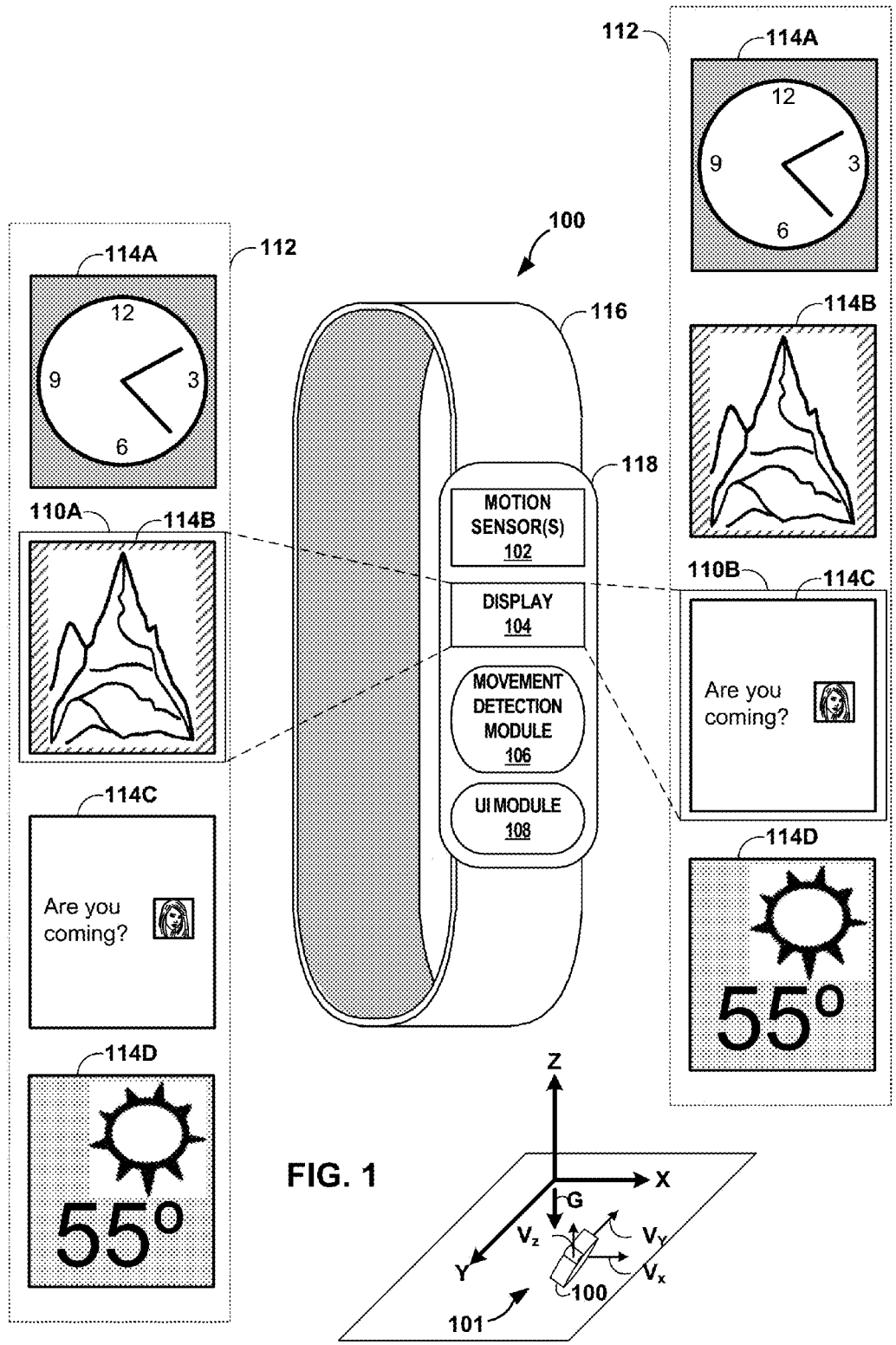
FIG. 1 is a block diagram illustrating a wearable computing device that enables motion based user interface navigation through content cards, in accordance with one or more aspects of the present disclosure.

In general, techniques of this disclosure may enable a wearable computing device (e.g., smart watches, activity trackers, heads-up display devices, etc.) to detect movement associated with the wearable computing device, and, in response to detecting a particular movement that approximates a predefined movement, output an altered presentation and/or arrangement of content cards displayed at a display component of the wearable computing device. For example, a wearable computing device (referred to herein simply as a "wearable") may output a graphical user interface (GUI) for presentation at a display (e.g., a display of the wearable). The GUI may include a list of content cards and each of the content cards may contain information (e.g., text, graphics, etc.) that is viewable at the display. In some implementations, only information associated with a current content card from the list may be visible at a given time, while information associated with the other content cards from the list may be not be visible at the given time.

Rather than requiring the user to provide a voice-command (e.g., by speaking the word "next" into a microphone of the wearable) or provide touch inputs (e.g., by tapping or sliding on a screen of the wearable) to instruct the wearable to update the GUI such that information associated with one or more of the other content cards is visible to the user, the wearable may enable the user to provide specific movements to cause the wearable to update the GUI, thereby enabling the user to navigate through the list of content cards. A motion sensor of the wearable may detect movement associated with the wearable itself (e.g., as the user moves and twists the body part or piece of clothing to which the wearable is attached). After detecting movement that corresponds to a predefined movement associated with a particular user interface navigation direction through the list, the wearable may select a card in the particular user interface navigation direction, and output the selected card for display. For example, if the user causes the wearable to move with a specific change in direction, speed, acceleration, rotation, etc., over a certain period of time (e.g., one second) the wearable may cause the display to replace, at the display, a current content card with a different content card from the list.

In this manner, techniques of this disclosure may enable a user to more quickly and easily view different content cards in a list by providing certain, easy-to-perform movements that may require less user focus or control than other types of inputs. Unlike other types of wearable devices that rely primarily on speech, touch, or other types of input, a wearable configured according to techniques of this disclosure can enable a user to more quickly and intuitively navigate through a list of content cards, even if the user is immersed in other activities. For example, even if a user is using his or her hands to cook, is standing in line at an airport, or is otherwise performing an activity that makes providing voice commands or touch inputs difficult, the user can easily navigate through a list of content cards displayed at a wearable device simply by moving himself or herself (and thus the wearable) according to a predetermined movement pattern.

FIG. 1 is a block diagram illustrating wearable computing device 100 (referred to simply as "wearable 100") that enables motion based user interface navigation through content cards, in accordance with one or more aspects of the present disclosure. In the example of FIG. 1, wearable 100 is a computerized watch. However in other examples, wearable computing device is a computerized fitness band/ tracker, computerized eyewear, computerized headwear, a computerized glove, etc. In other examples, wearable 100 may be any type of mobile computing device that can attach to and be worn on a person's body or clothing. For example, any tablet computer, mobile phone, personal digital assistant (PDA), game system or controller, media player, e-book reader, television platform, navigation system, remote control, or other mobile computing device that can easily be moved by a user in accordance with the below described techniques.

As shown in FIG. 1, in some examples, wearable 100 may include attachment component 116 and electrical housing 118. Housing 118 of wearable 100 includes a physical portion of a wearable computing device that houses a combination of hardware, software, firmware, and/or other electrical components of wearable 100. For example, FIG. 1 shows that within housing 118, wearable 100 may include motion sensor(s) 102, display 104, movement detection module 106, and user interface (UI) module 108.

Attachment component 116 may include a physical portion of a wearable computing device that comes in contact with a body (e.g., tissue, muscle, skin, hair, clothing, etc.) of a user when the user is wearing wearable 100 (though, in some examples, portions of housing 118 may also come in contact with the body of the user). For example, in cases where wearable 100 is a watch, attachment component 116 may be a watch band that fits around a user's wrist and comes in contact with the skin of the user. In examples where wearable 100 is eyewear or headwear, attachment component 116 may be a portion of the frame of the eyewear or headwear that fits around a user's head, and when wearable 100 is a glove, attachment component 116 may be the material of the glove that conforms to the fingers and hand of the user. In some examples, wearable 100 can be grasped and held from housing 118 and/or attachment component 116.

Modules 106 and 108 may perform operations described herein using software, hardware, firmware, or a mixture of hardware, software, and/or firmware residing in and/or executing at wearable 100. Wearable 100 may execute modules 106 and 108 with one or more processors located within housing 118. In some examples, wearable 100 may execute modules 106 and 108 as one or more virtual machines executing on underlying hardware of wearable 100 located within housing 118. Modules 106 and 108 may execute as one or more services or components of operating systems or computing platforms of wearable 100. Modules 106 and 108 may execute as one or more executable programs at application layers of computing platforms of wearable 100. In other examples, motion sensors 102, display 104, and/or modules 106 and 108 may be arranged remotely to housing 118 and be remotely accessible to wearable 100, for instance, via interaction by wearable 100 with one or more network services operating at a network or in a network cloud.

Motion sensors 102 represent one or more motion sensors or input devices configured to detect indications of movement (e.g., data representing movement) associated with wearable 100. Examples of motion sensors 102 include accelerometers, speed sensors, gyroscopes, tilt sensors, barometers, proximity sensors, ambient light sensors, cameras, microphones, or any and all other types of input devices or sensors that can generate data from which wearable device 100 can determine movement.

Motions sensors 102 may generate "raw" motion data when a user of wearable 100 causes attachment component 116 and/or housing 118 to move. For example, as a user twists his or her wrist or moves his or her arm while wearing attachment component 116, motion sensors 102 may output raw motion data (e.g., indicating an amount of movement and a time at which the movement was detected) being generated during the movement to movement detection module 106. The motion data may indicate one or more characteristics of movement including at least one of an acceleration, a level of tilt, a direction, a speed, a degree of rotation, a degree of orientation, or a level of luminance.

In some examples, the motion data generated by motion sensors 102 may be a series of motion vectors. For instance, at time t, a three-axis accelerometer of motion sensors 102 may generate motion vector $(V_x, V_y, V_z)$ where with the $V_x$ value that indicates the acceleration of wearable 100 along an X-axis, the $V_y$ value that indicates the acceleration of wearable 100 along a Y-axis, and the $V_z$ value that indicates the acceleration of wearable 100 along a Z-axis. In some examples, the X-axis and the Y-axis may define a plane substantially parallel to display 104, and the Z-axis may be perpendicular to both the X-axis and the Y-axis. As illustrated in FIG. 1, when the user is interacting with wearable 100, wearable 100 may be considered to be in tilt orientation 101 in which the Z-axis may be perpendicular to gravity vector G.

Movement detection module 106 obtains motion sensor data generated by motion sensors 102 and processes the motion sensor data to identify or otherwise determine what specific types and characteristics of movement are being detected by motion sensors 102. Said differently, movement detection module 106 determines, based on motion sensor data, when, how, and in what direction that wearable 100 is moving. Movement detection module 106 may provide, based on motion data obtained from motion sensors 102, an indication (e.g., data) of when wearable 100 is detected moving in a recognizable, predefined, pattern or profile of movement. For example, movement detection module 106 may alert (e.g., trigger an interrupt, send a message, etc.) UI module 108 when movement detection module 106 identifies motion data obtained from motion sensors 102 that at least approximately corresponds to one or more of predefined movements. Movement detection module 106 may provide to UI module 108, data about the detected movement, for instance, data that defines the particular predefined movement indicated by the motion data.

As described below, UI module 108 may cause wearable 100 to perform one or more operations based on movement detected by movement detection module 106. For example, UI module 108 may alter the presentation of a user interface (e.g., user interfaces 110A and 110B) depending on the predefined movement identified by movement detection module 106. For example, at any particular time, movement detection module 106 may obtain motion sensor data, check the motion sensor data against one or more expected sensor data patterns or profiles that are normally observed by motion sensors 102 when wearable 100 moves in a certain direction, speed, acceleration, etc., and output data to UI module 108 that defines the predefined movement of wearable 100 being recognized from the motion sensor data. UI module 108 may alter the presentation of a user interface depending on the predefined movement identified by movement detection module 106.

Display 104 of wearable 100 may provide output functionality for wearable 100. Display 104 may be implemented using one or more various technologies. For instance, Display 104 may function as an output device using any one or more display devices, such as a liquid crystal display (LCD), a dot matrix display, a light emitting diode (LED) display, an organic light-emitting diode (OLED) display, e-ink, or similar monochrome or color displays capable of outputting visible information to a user of wearable 100. In some examples, display 104 may function as input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology.

Display 104 may present the output as a graphical user interface, which may be associated with functionality provided by wearable 100. For example, display 104 may present user interfaces 110A and 110B (collectively, "user interfaces 110"). Each of user interfaces 110 may include a current content card of a list of content cards. For instance, in the example of FIG. 1, user interface 110A includes content card 114B of list 112 of content cards 114A-114D (collectively, "content cards 114") and user interface includes content card 114C of the same list 112 of content cards 114. Each of content cards 114 may contain information (e.g., text, graphics, etc.) that is displayable by display 104.

Each of content cards 114 may be associated with functionality of computing platforms, operating systems, applications, and/or services executing at or accessible by wearable 100 (e.g., notification services, electronic message applications, Internet browser applications, mobile or desktop operating systems, etc.). A user may interact with user interfaces 110 while being presented at display 104 to cause wearable 100 to perform operations relating to the functions.

Content card 114A represents a content card that includes an image of a clock associated with a time or calendar application. Content card 114B may include a photo, video, or other image data associated with a photo or imaging application (e.g., a viewfinder of a camera, a picture or video playback, etc.). Content card 114D represents a content card that includes weather information directed to a weather information services application (e.g., for viewing a forecast, receiving emergency weather alerts, etc.). Content card 114C represents a content card that includes information associated with a text-based messaging service application executing at wearable 100. Content card 114C may include text-based information related to a conversation between a user of wearable 100 and another user of the messaging service. For example, a message account associated with wearable 100 may receive a notification or alert to a message received from a messaging service. Wearable 100 may present the information associated with content card 114C in response to the receipt of the notification. From content card 114C, the user of wearable 100 can view the content associated with the message and compose a reply message. Still many other examples of content cards 114 exist, including media player related content cards, Internet search (e.g., text-based, voice-based, etc.) related content cards, navigation related content cards, and the like.

In some examples, lists of content cards may be at different hierarchical levels and content cards at a particular hierarchical level may correspond to lists of content cards at different hierarchical levels. For instance, list 112 of content cards 114 may be at a first hierarchical level and content card 114C may correspond to a different list of content cards at a lower hierarchical level than list 112. In some examples, the lists of content cards may be referred to as bundles of content cards.

UI module 108 may receive and interpret movements identified by movement detection module 106 (e.g., from motion sensors 102). UI module 108 may cause wearable 100 to perform functions by relaying information about the detected inputs and identified movements to one or more associated platforms, operating systems, applications, and/or services executing at wearable 100.

Responsive to obtaining and relaying information about the identified movements, UI module 108 may receive information and instructions from the one or more associated platforms, operating systems, applications, and/or services executing at wearable 100 for generating and altering a user interface associated with wearable 100 (e.g., user interfaces 110A and 110B). In this way, UI module 108 may act as an intermediary between the one or more associated platforms, operating systems, applications, and/or services executing at wearable 100 and various input and output devices of wearable 100 (e.g., display 104, motion sensors 102, a speaker, a LED indicator, other output devices, etc.) to produce output (e.g., a graphic, a flash of light, a sound, a haptic response, etc.) with wearable 100.

In some examples, UI module 108 may interpret movement data detected by movement detection module 106, and in response to the inputs and/or movement data, cause display 104 to alter the presented user interface. For instance, in one example, a user may cause housing 118 and/or attachment 116 of wearable 100 to move. UI module 108 may alter the user interface presented at display 104 in response to detecting the movement. For example, UI module 108 may cause display 104 to present user interface 110A prior to the movement (i.e., cause display 104 to display content card 114B prior to the movement), and may cause display 104 to present user interface 110B after the movement (i.e., cause display 104 to display content card 114C after to the movement).

UI module 108 may maintain a data store that maintains an association between one or more predefined movements and one or more respective user interface navigation commands for navigating through content cards 114. Some example user interface navigation commands which may be associated with predefined movements include, but are not limited to, a next navigation command to move to a next content card in a current list of content cards, a previous navigation command to move to a previous content card in a current list of content cards, an into navigation command to move into a list of content cards at a lower hierarchical level that corresponds to the current content card, an out navigation command to move into a list of content cards at a higher hierarchical level, and a reset navigation command. In some examples, the next navigation command may be associated with a movement that includes a supination of the forearm of the user followed by a pronation of the forearm of the user at an acceleration that is less than an acceleration of the supination. In some examples, the previous navigation command may be associated with a movement that includes a supination of the forearm of the user followed by a pronation of the forearm of the user at an acceleration that is greater than an acceleration of the supination. In some examples, the into navigation command may be associated with a movement that includes a lowering of the forearm of the user away from a head of the user followed by a raising of the forearm of the user toward the head of the user. In some examples, the out navigation command may be associated with a movement that includes a raising of the forearm of the user towards the head of the user followed by a lowering of the forearm of the user away from the head of the user. In some examples, the reset navigation command may be associated with a movement that includes a repeated pronation and supination of the forearm of the user (e.g., two or three cycles of pronation and supination) within a period of time When UI module 108 determines that one of the predefined movements of wearable 100 has been identified by movement detection module 106, UI module 108 may select the content card of content cards 114 in the corresponding navigation direction. UI module 108 may cause display 104 to present the selected content card of content cards 114. In this way, UI module 108 may enable navigation through content cards in response to, and based on, movement that corresponds to a predefined movement.

In operation, wearable 100 may display a current content card of a list of content cards. For example, UI module 108 may cause display 104 to present user interface 110A which includes content card 114B of list 112 of content cards 114.

In the example of FIG. 1, the user of wearable 100 may desire to scroll to the next content card in list 112. As such, the user may perform a gesture that includes a supination of the forearm of the user followed by a pronation of the forearm of the user at an acceleration that is less than an acceleration of the supination. In other words, the user may flick their wrist away from themselves.

A motion sensor of wearable 100 may detect movement of wearable 100. For example, one or more motion sensors 102 (e.g., tilt sensors, gyros, accelerometers, etc.) may detect movement of wearable 100 as a user moves (e.g., twists) the part of his or her body that attachment component 116 is attached to, and causes the direction, acceleration, orientation, etc. of housing 118 and/or attachment component 116 to change. Based on the detected movement, motion sensors 102 may generate motion data that defines the detected movement. Movement detection module 106 may obtain the motion data generated by motion sensors 102 while wearable 100 moves.

Movement detection module 106 may compare the movement data obtained from motion sensors 102 to a database or data store of one or more predefined movements. Movement detection module 106 may determine that the motion sensor data matches or otherwise correlates to a particular movement of wearable 100 when a user of wearable 100 waves, twists, shakes, or otherwise moves the arm or wrist that attachment component 116 is fastened to. For instance, movement detection module 106 may determine that the motion sensor data indicates a change in speed, acceleration, direction, rotation, or other characteristic of movement that corresponds to the movement of wearable 100 when a person twists his or her arm or wrist in a certain way. Movement detection module 106 may output an indication (e.g., data) to UI module 108 that alerts UI module 108 as to which of the predefined movements the motion sensor data corresponds. In the example of FIG. 1, movement detection module 106 may output an indication to UI module 108 that the motion sensor data corresponds to a movement that includes a supination of the forearm of the user followed by a pronation of the forearm of the user at an acceleration that is less than an acceleration of the supination.

Responsive to determining that the movement of wearable 100 corresponds to a predefined movement, UI module 108 may alter the presented user interface based on the predefined movement. For instance, UI module 108 may determine which navigation command is associated with the predefined movement, select a content card based on the determined navigation command, and cause display 104 to present the selected content card. In the example of FIG. 1, UI module 108 may determine that the predefined movement is associated with the next navigation command, select content card 114C as the next content card in list 112, and cause display 104 to present user interface 110B that includes content card 114C.

In this manner, wearable may enable a user to more quickly and easily view different content cards 114 by moving wearable 100 in a certain way. By providing certain, easy-to-perform movements while wearing wearable 100, that require less focus or control, than other types of inputs, a wearable such as wearable 100 may enable a user to more quickly and intuitively navigate through a visual stack of content cards, even if the user is immersed in other activities that demand much of the user's attention or focus.

In some examples, the techniques of this disclosure may enable a user to perform operations other than navigating through content cards. As one example, where wearable 100 is configured to perform media (e.g., music, video, etc.) playback, the next navigation command may cause wearable 100 to advance to a next media element (e.g., a next song) and the previous navigation command may cause wearable 100 to return to a previous media element (e.g., a previous song). In some of such examples, the into and out navigation commands may cause wearable 100 to adjust the functions of the next and previous navigation commands. For instance, a first into navigation command may cause wearable 100 to adjust the functions of the next and previous navigation commands such that the next navigation command fast-forwards a currently playing media element and the previous navigation command rewinds the currently playing media element. Similarly, a second into navigation command may cause wearable 100 to adjust the functions of the next and previous navigation commands such that the next navigation command increases the playback volume of a currently playing media element and the previous navigation command decreases the playback volume of the currently playing media element.

Unlike other types of wearable devices that rely primarily on speech, touch, or other types of input, a wearable configured in accordance with the techniques of this disclosure may enable a user to easily navigate through content cards, even if the user is using his or her hands to perform some other action that is unrelated to the navigation of the content cards (e.g., cooking, bicycling, standing in line at an airport, etc.) or otherwise makes providing voice commands or touch inputs difficult. Because the wearable may enable a user to more easily navigate through content cards through simple movements, the wearable according to these techniques may receive fewer false or incorrect touch or spoken inputs. By processing fewer false or incorrect inputs, the techniques may enable a wearable to perform fewer operations and conserve electrical (e.g. battery) power.

Figure 2:
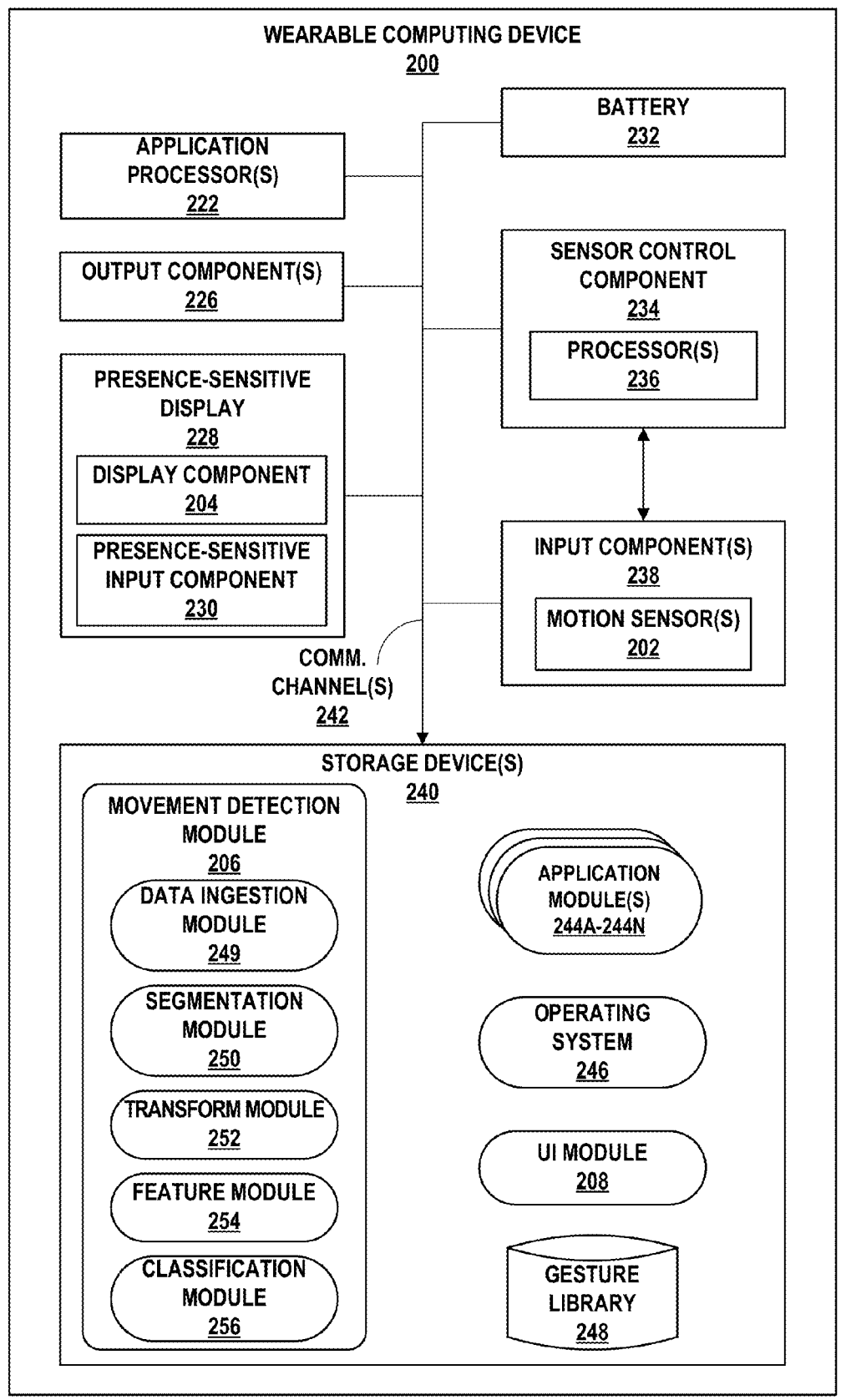
FIG. 2 is a block diagram illustrating an example wearable computing device that enables motion based user interface navigation through content cards, in accordance with one or more aspects of the present disclosure.

FIG. 2 is a block diagram illustrating an example wearable computing device that enables motion based user interface navigation through content cards, in accordance with one or more aspects of the present disclosure. Wearable 200 of FIG. 2 illustrates only one particular example of wearable 100 of FIG. 1, and many other examples of wearable 100 may be used in other instances and may include a subset of the components included in example wearable 200 or may include additional components not shown in FIG. 2.

As shown in the example of FIG. 2, wearable 200 includes application processor(s) 222, input components 224, output components 226, presence-sensitive display 228, battery 232, sensor control component (SCC) 234, and storage device(s) 240. In the illustrated example, input components 238 includes motion sensors 202, SCC 234 includes processor(s) 236, presence-sensitive display 228 includes display component 204 and presence-sensitive input component 230, and storage devices 240 of wearable 200 includes movement detection module 206, UI module 208, application modules 244A-244N (collectively referred to as "application modules 244"), operating system 246, and gesture library 248. In the illustrated example, movement detection module 206 includes segmentation module 250, transform module 252, feature module 254, and classification module 256. Communication channels 242 may interconnect each of the components 222, 226, 228, 232, 234, 238, and 240 for inter-component communications (physically, communicatively, and/or operatively). In some examples, communication channels 242 may include a system bus, a network connection, an inter-process communication data structure, or any other method for communicating data.

Application processors 222, in one example, are configured to implement functionality and/or process instructions for execution within computing device 200. For example, application processors 222 may be capable of processing instructions stored in storage device 240. Examples of processors application 222 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 240 may be configured to store information within computing device 200 during operation. Storage device 240, in some examples, is described as a computer-readable storage medium. In some examples, storage device 240 is a temporary memory, meaning that a primary purpose of storage device 240 is not long-term storage. Storage device 240, in some examples, is described as a volatile memory, meaning that storage device 240 does not maintain stored contents when the computing device is turned off. Examples of volatile memories include random access memories (RAM), dynamic random access memories (DRAM), static random access memories (SRAM), and other forms of volatile memories known in the art. In some examples, storage device 240 is used to store program instructions for execution by processors 222. Storage device 240, in one example, is used by software or applications running on computing device 200 (e.g., application modules 244) to temporarily store information during program execution.

Storage devices 240, in some examples, also include one or more computer-readable storage media. Storage devices 240 may be configured to store larger amounts of information than volatile memory. Storage devices 240 may further be configured for long-term storage of information. In some examples, storage devices 240 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

One or more input components 238 of computing device 200 may receive input. Examples of input are tactile, audio, and video input. Input components 238 of computing device 200, in one example, includes a presence-sensitive display, touch-sensitive screen, mouse, keyboard, joystick, physical button/switch, voice responsive system, camera, microphone or any other type of device for detecting input from a human or machine.

As illustrated in FIG. 2, in some examples, input components 238 may include one or more motion sensors 202, which may be configured to perform operations similar to motion sensors 102 of FIG. 1. For instance, motion sensors 202 may generate motion data, such as a sequence of motion vectors, that indicates movement (e.g., data representing movement) associated with wearable 200.

In some examples, in addition to motion sensors 202, input components 238 may include one or more other sensors, such as one or more location sensors (e.g., a global positioning system (GPS) sensor, an indoor positioning sensor, or the like), one or more light sensors, one or more temperature sensors, one or more pressure (or grip) sensors, one or more physical switches, one or more proximity sensors, and one or more bio-sensors that can measure properties of the skin/blood, such as oxygen saturation, pulse, alcohol, blood sugar etc.

One or more output components 226 of computing device 200 may generate output. Examples of output are tactile, audio, and video output. Output components 226 of computing device 200, in one example, includes a presence-sensitive display, sound card, video graphics adapter card, speaker, electronic display, or any other type of device for generating output to a human or machine. The electronic display may be an LCD or OLED part of a touch screen, may be a non-touchscreen direct view display component such as a CRT, LED, LCD, or OLED. The display component may also be a projector instead of a direct view display.

Presence-sensitive display 228 of computing device 200 includes display component 204 and presence-sensitive input component 230. Display component 204 may be a screen at which information is displayed by presence-sensitive display 228 and presence-sensitive input component 230 may detect an object at and/or near display component 204. As one example range, a presence-sensitive input component 230 may detect an object, such as a finger or stylus that is within 2 inches (~5.08 centimeters) or less from display component 204. Presence-sensitive input component 230 may determine a location (e.g., an (x,y) coordinate) of display component 204 at which the object was detected. In another example range, presence-sensitive input component 230 may detect an object 6 inches (~15.24 centimeters) or less from display component 204 and other exemplary ranges are also possible. Presence-sensitive input component 230 may determine the location of display component 204 selected by a user's finger using capacitive, inductive, and/or optical recognition techniques. In some examples, presence sensitive input component 230 also provides output to a user using tactile, audio, or video stimuli as described with respect to display component 204. In the example of FIG. 2, presence-sensitive display 228 presents a user interface (such as user interface 110A or user interface 110B of FIG. 1).

While illustrated as an internal component of computing device 200, presence-sensitive display 228 may also represent and external component that shares a data path with computing device 200 for transmitting and/or receiving input and output. For instance, in one example, presence-sensitive display 228 represents a built-in component of computing device 200 located within and physically connected to the external packaging of computing device 200 (e.g., a screen on a mobile phone). In another example, presence-sensitive display 228 represents an external component of computing device 200 located outside and physically separated from the packaging of computing device 200 (e.g., a monitor, a projector, etc. that shares a wired and/or wireless data path with a tablet computer).

Battery 232 may provide power to one or more components of wearable computing device 200. Examples of battery 232 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. Battery 232 may have a limited capacity (e.g., 1000-3000 mAh).

In some examples, wearable 200 may include SCC 234. SCC 234 may communicate with one or more of input components 238, such as motion sensors 202. In some examples, SCC 234 may be referred to as a "sensor hub" that operates as an input/output controller for one or more of input components 238. For example, SCC 234 may exchange data with one or more of input components 238, such as motion data corresponding to wearable 200. SCC 238 may also communicate with application processors 222. In some examples, SCC 238 may use less power than application processors 222. As one example, in operation, SCC 238 may use power in a range of 20-200 mW. In some examples, SCC 238 may be referred to as a digital signal processor (DSP) or advanced DSP (ADSP) that operates as an input/output controller for one or more of input components 238. As illustrated in the example of FIG. 2, SCC 234 may include one or more processors 236. In some examples, as opposed to executing on application processors 222, one or more modules may execute on processors 236. As one example, movement detection module 206 may execute on processors 236. In this way, as SCC 234 uses less power than application processors 222, wearable 200 may reduce the amount of power consumed to detect movements of wearable 200.

Computing device 200 may include operating system 246. Operating system 246, in some examples, controls the operation of components of computing device 200. For example, operating system 246, in one example, facilitates the communication of movement detection module 206, UI module 208, application modules 244, and gesture library 248 with processors 222, output components 226, presence-sensitive display 228, SCC 234, and input components 238. One or more components of storage devices 240 may include program instructions and/or data that are executable by computing device 200. As one example, movement detection module 206 and UI module 208 may include instructions that cause computing device 200 to perform one or more of the operations and actions described in the present disclosure. In some examples, one or more of the components illustrated in storage device 240 may be implemented in hardware and/or a combination of software and hardware.

One or more application modules 244 may provide graphical information and instructions to UI module 208 that UI module 208 includes as content or information contained in a graphical representation of content cards, such as content cards 114 of FIG. 1. For example, application module 244A may be a messaging application that executes at wearable 200 to provide wearable 200 with access to a messaging service. Application module 244A may obtain information (e.g., via a network) that includes content of a message received by a messaging account associated with wearable 200. Application module 244A may provide the content of the message (e.g., textual information) as well as instructions for causing UI module 208 to output content card 114C of FIG. 1 for display at display component 204. Application modules 244B-244N may likewise each provide respective information and instructions for causing UI module 208 to present the content associated with each of content cards 114.

Movement detection module 206 may be executable to perform functionality similar to movement detection module 106 of FIG. 1. For instance, movement detection module 206 may obtain motion sensor data generated by motion sensors 202, and process the motion sensor data to identify or otherwise determine what specific types and characteristics of movement are being detected by motion sensors 202. In some examples, movement detection module 206 may be implemented in a way that is optimized for power and latency. For instance, movement detection module 206 may read motion data from a motion sensor, such as an accelerometer of motion sensors 202, to detect gestures. In some examples, movement detection module 206 may read the motion data in batch mode to save power. Movement detection module 206 may look for chunks of time segments that are potentially a user gesture, extract features out of the chunks, and classify each of the chunks as a gesture (or not). Movement detection module 206 may provide one or more advantages. As one example, movement detection module 206 may detect different gestures using the same framework. As another example, movement detection module 206 may detect gestures of different lengths. As illustrated in FIG. 2, movement detection module 206 may include data ingestion module 249, segmentation module 250, transform module 252, feature module 254, and classification module 256.

Data ingestion module 249 may be executable to read and process motion data generated by motion sensors 202. In some examples, data ingestion module 249 may utilize a synchronized circular buffer to store the motion data. Further details of examples of data ingestion module 249 are discussed below with reference to FIGS. 8 and 9.

Segmentation module 250 may be executable to determine one or more segments of motion data for further analysis. Segmentation module 250 may determine a segment of motion data as a series of values of motion data that have one or more properties. Details of an example segmentation process that may be performed by segmentation module 250 are discussed below with reference to FIG. 10. Segmentation module 250 may output an indication of the determined segment to one or more other components of movement detection module 206, such as transform module 252 and/or feature module 254.

Transform module 252 may be executable to transform motion data between different coordinate systems. For instance, transform module 252 may convert motion data from a first coordinate system to a second coordinate system. In some examples, the first coordinate system may define the orientation of wearable 200 relative to the gravity vector and the second coordinate system may define the orientation of wearable 200 relative to a task-specific orientation. For instance, the second coordinate system may utilize the tilt orientation of wearable 200 (i.e., the orientation of wearable 200 during user interactions) as the task-specific orientation. In any case, transform module 252 may output the converted motion vectors to one or more other components of wearable 200, such as feature module 254. Details of an example transformation process that may be performed by transform module 252 are discussed below with reference to FIGS. 11A and 11B.

Feature module 254 may be executable to determine one or more features of a segment of motion data. For instance, feature module 254 may determine one or more features of a segment of motion data determined by segmentation module 250. In some examples, the features determined by feature module 245 may be different types of features. For instance, feature module 254 may determine critical-point features, temporal histograms, cross-channel statistics, per-channel statistics, and basic signal properties. In some examples, feature module 254 may determine the features of a segment using untransformed motion data (i.e., motion data in the first coordinate system). In some examples, feature module 254 may determine the features of a segment using transformed motion data (i.e., motion data in the second coordinate system). In some examples, feature module 254 may determine the features of a segment using a combination of untransformed and transformed motion data. Feature module 254 may output an indication of the determined features to one or more other components of wearable 200, such as classification module 256.

As discussed above, in some examples, feature module 254 may determine critical point features for a segment of motion data (i.e., a sequence of motion vectors $[m_1, m_2, \ldots, m_n]$, referred to below as the signal). In some examples, feature module 254 may convolve the signal with a low-pass filter of small kernel size (e.g., with a width of four to five measurements) to generate a filtered signal. This convolution may eliminate or reduce the amount of high frequency noise in the signal. Feature module 254 may determine, in the filtered signal, one or more critical points, and determine one or more properties based on the determined prominent maximums and prominent minimums. The one or more critical points may include one or more prominent maximums and/or one or more prominent minimums.

To determine the one or more prominent maximums, feature module 254 may determine all points in the filtered signal that satisfy the following definition: (Prominent maximum) M is a prominent maximum in the signal for a prominence threshold T if and only if two conditions are satisfied. The first condition that must be satisfied in order to M to be a prominent maximum is that M is a local maximum of the filtered signal. The second condition that must be satisfied in order to M to be a prominent maximum is that there is no other local maximum_alt in the filtered signal such that: (i) value(M_alt) is greater than value(M) (i.e., value(M_alt)>value(M)) and (ii) there is no local minimum m in the signal between M_alt and M such that value(M) minus value(m) is greater than or equal to T (i.e., value(M)−value(M)>=T).

To determine the one or more prominent minimums, feature module 254 may determine all points in the filtered signal that satisfy the following definition: (Prominent minimum) m is a prominent minimum in the signal for the prominence threshold T if and only if two conditions are satisfied. The first condition that must be satisfied in order to M to be a prominent minimum is that m is a local minimum of the signal. The second condition that must be satisfied in order to M to be a prominent minimum is that M=there is no other local minimum m_alt in the filtered signal such that: (i) value(m_alt) is less than value(m) (i.e., value(m_alt)<value(m)) and (ii) there is no local maximum M in the signal between m_alt and m such that value(M) minus value(m) is greater than or equal to T (i.e., value(M)−value(M)>=T).

Feature module 254 may determine one or more properties based on the determined prominent maximums and prominent minimums. As one example, feature module 254 may determine a number of prominent maxima in the A-axis of the transformed motion data (i.e., the (A,U,V signal). As another example, feature module 254 may determine a number of prominent maxima in the magnitude of the untransformed motion data (i.e., the X,Y,Z signal). As another example, feature module 254 may determine a number of prominent maxima in each channel of the one of the untransformed motion data (i.e., each one of the X, Y, and Z channels). As another example, feature module 254 may determine a number of prominent minima in each channel of the one of the untransformed motion data (i.e., each one of the X, Y, and Z channels). As another example, feature module 254 may determine a four-bin histogram of orientations of prominent maxima in the A-axis of the transformed motion data, where each orientation is the angle of the transformed motion data in the U-V plane, and each "vote" on the histogram is weighted by the value of the A coordinate. As another example, feature module 254 may determine a four-bin histogram of values of prominent maxima in the magnitude of the untransformed motion data (i.e., the X,Y,Z signal). As another example, feature module 254 may determine a four-bin histogram of differences between consecutive prominent maxima in the magnitude of the untransformed motion data (i.e., the X,Y,Z signal). Feature module 254 may concatenate the resulting values for the one or more properties into a multidimensional feature vector (e.g., a 20-dimensional feature vector). In this way, feature module 254 may determine critical-point features of a segment of motion data.

As discussed above, in some examples, feature module 254 may determine temporal histograms for a segment of motion data. In some examples, feature module 254 may determine the temporal histograms based on unfiltered transformed motion data (i.e., the A,U,V signal). Each bin of each temporal histogram may cover one-fifth of the temporal interval of a candidate segment (i.e., there is a bin for the first fifth, another bin for the second fifth, and so on) and each of these bins may accumulate the values of all measurements that are contained in its temporal interval. For instance, feature module 254 may compute the following 5-bin histogram from the A,U,V signal: values on the A channel, values on the U channel, values on the V channel, first-order (temporal) derivatives of values on the A channel, first-order (temporal) derivatives of values on the U channel, and first-order (temporal) derivatives of values on the V channel. Feature module 254 may accumulate the resulting values on the bins of these histograms and concatenate the accumulated values into a feature vector (e.g., a 30-dimensional feature vector). In this way, feature module 254 may determine temporal histograms for a segment of motion data.

As discussed above, in some examples, feature module 254 may determine the cross-channel statistics for a segment of motion data. In some examples, feature module 254 may determine cross-channel statistics based on unfiltered untransformed motion data (i.e., the X,Y,Z signal). For instance, for each pair of distinct channels C1 and C2 (i.e., C1=X, C2=Y; C1=Y, C2=Z; and C1=Z, C2=X), feature module 254 may determine the cross-channel statistics by computing the correlation between the time series of C1 and C2 measurements, and the Euclidean (RMS) distance between the vectors of C1 and C2 measurements. Feature module 254 may concatenate the resulting values of these properties into a feature vector (e.g., a 6-dimensional feature vector). In this way, feature module 254 may determine cross-channel statistics of a segment of motion data.

As discussed above, in some examples, feature module 254 may determine per-channel statistics for a segment of motion data. In some examples, feature module 254 may determine the per-channel statistics based on unfiltered untransformed motion data (i.e., the X,Y,Z signal). For instance, for each channel (X, Y, and Z), feature module 254 may compute the one or more properties within the segment. As one example, feature module 254 may compute the maximum value of the signal within the segment. As one example, feature module 254 may compute the minimum value of the signal within the segment. Feature module 254 may concatenate the resulting values of these properties into a feature vector (e.g., a 6-dimensional feature vector). In this way, feature module 254 may determine per-channel statistics of a segment of motion data.

As discussed above, in some examples, feature module 254 may determine basic signal properties for a segment of motion data. As one example, feature module 254 may determine the near orientation of a segment (i.e., a coordinate and normalized time of measurement closest to z_t). As another example, feature module 254 may determine the far orientation of a segment (i.e., a coordinate and normalized time of measurement furthest from z_t). As another example, feature module 254 may determine the polarity of a segment (i.e., +1 if movement is mostly from Near to Far orientation, −1 otherwise). As another example, feature module 254 may determine the azimuth of a segment (i.e., direction of segment's temporal derivative in its Near endpoint, with segment traced from Near point (regardless of actual polarity)). In some examples, feature module 254 based the determination of the azimuth of a segment on a pre-defined linear combination of the temporal derivative directions along the entire segment, with a possible bias toward the Near point. As another example, feature module 254 may determine the amplitude of a segment (i.e., geodesic distance between first and last measurements in a segment). As another example, feature module 254 may determine the duration of a segment (i.e., temporal distance between first and last measurements in a segment). Feature module 254 may concatenate the resulting values of these properties into a feature vector (e.g., a 10-dimensional feature vector). In this way, feature module 254 may determine basic signal properties of a segment of motion data.

Classification module 256 may be executable to classify segments of motion data into a category (e.g., a predefined movement). For instance, classification module 256 may use an inference model to classify a segment of motion data into a category based on respective corresponding feature vectors received from feature module 254. Classification module 256 may use any type of classifier to classify segments of motion data. Some example classifiers that classification module 256 may use include, but are not limited to, SimpleLogistic and Support Vector Machines (SVM).

SimpleLogistic method is built upon multinomial logistic regression. Multinomial logistic regression models posterior probability of classes with linear functions of features through a softmax normalization. Some logistic regression training methods utilize the entire feature set to get the optimal parameters. But, SimpleLogistic method may add one feature at a time. In each iteration, the model built with previously selected features is used to get the current error in estimation of posterior probability of the classes. The next feature to add to the model may be the one that best predicts this error through a linear regression model. Likewise, the residual error may be minimized by adding the another feature. The optimal number of features are obtained based on cross-validation. Since not all features are selected in the final model, SimpleLogistc may result in a sparse model (similar to regularization effect) and yield a more robust model with given large feature set. In some examples, the model used for SimpleLogistic may be stored in gesture library 248.

SVMs are powerful linear classifiers that maximize the margin between two different classes. SVMs can be extended to nonlinear cases using the kernel trick, which is implicit mapping of data to higher dimensional spaces where the classes can be linearly separated. In some examples, the RBF kernel for nonlinear SVMs may be used. Since there are multiple classes, a onevsone strategy may be employed to train the SVM. In this strategy, $C*(C1)/2$ SVM classifiers may be trained for every possible pair of classes and at test time the class with the majority of votes is selected. The SVM is tested on the dataset collected from wearables worn by a set of subjects. The groundtruth labels were obtained by a set of experts who labeled the data by looking at the accelerometer signal. In some examples, SVMs may outperform SimpleLogistic by 2% at the cost of adding 50 ms to the latency. In some examples, the trained SVM data may be stored in gesture library 248.

Regardless of the classifier used, classification module 256 may output the category for the segment to one or more other components of wearable 200, such as UI module 208. In this way, classification module 256 may classify segments of motion data into a category.

UI module 208 may perform operations similar to UI module 108 of FIG. 1. For instance, UI module 208 may receive the classification for a segment of motion data, and, in response to the classification, cause display 204 to alter the presented user interface. In particular, UI module 208 may determine a navigation command that corresponds to the classification determined by classification module 256, select a content card is in the corresponding navigation direction, and cause display 204 to present the selected content card. In this way, UI module 208 may enable navigation through content cards in response to, and based on, movement that corresponds to a predefined movement.

In some examples, movement detection module 206 may be executed by application processors 222. However, as discussed above, in some examples, it may be advantageous to for SCC 234 to perform one or more operations described above as being performed by movement detection module 206. For instance, movement detection module 206 may have a significant impact on battery life when executing on application processors 222. As such, in some examples where movement detection module 206 is executed by application processors 222 (V1), gesture/movement recognition may be enabled for applications running in the foreground or in AmbiActive mode. By contrast, in some examples where one or more operations described above as being performed by movement detection module 206 are performed by SCC 234 (V2), gesture/movement recognition may be enabled for applications running in the foreground or in AmbiActive mode and applications not running in the foreground or in AmbiActive mode.

In some examples, it may be desirable to selectively control which applications have the ability to perform gesture detection in the background (e.g., to prevent accidental battery draining). For instance, in some wearables that do not support performing gesture detection operations on SCC 234, it may be desirable to prevent applications from performing gesture detection in the background. A proposed way to achieve that balance is as follows: a WristGestureManager may accept subscriptions from multiple applications. By default, applications may be notified about gestures only when they are running on foreground. On the subscription call, each of the applications may (optionally) specify if it wishes to receive gesture notifications in each one of a set of special cases. One example special case is when the application is running on AmbiActive mode. Another example special case is when the application is running on background, regardless of whether there is another application on foreground or on AmbiActive mode, or the screen is off. In any case, on the subscription reply, the WristGestureManager may grant or deny these special case requests depending on power characteristics of the current gesture detection implementation on the device.

In some examples, in order to implement both the mechanisms for V1 and for V2, the WristGestureManager may monitor the state of each registered app through the ActivityManagerService and automatically disable gesture detection as soon as none of the registered apps is in a state where it needs to be notified about wrist gestures. In cases where apps only use gestures when they are running on foreground or on AmbiActive modes (V1), there may not be a need for arbitration since at any instant there is at most one application that must be notified about gestures. However, arbitration may become an issue when applications running on background can be controlled by wrist gestures (V2). In such cases, one or more arbitration rules may be used to arbitrate between applications. If an application that currently subscribes to gestures is running in foreground or AmbiActive, then only that application receives gesture notifications. Otherwise, only the application among those subscribing to on-background gestures that was most recently on active or AmbiActive modes may receive gesture notifications.

Figure 3:
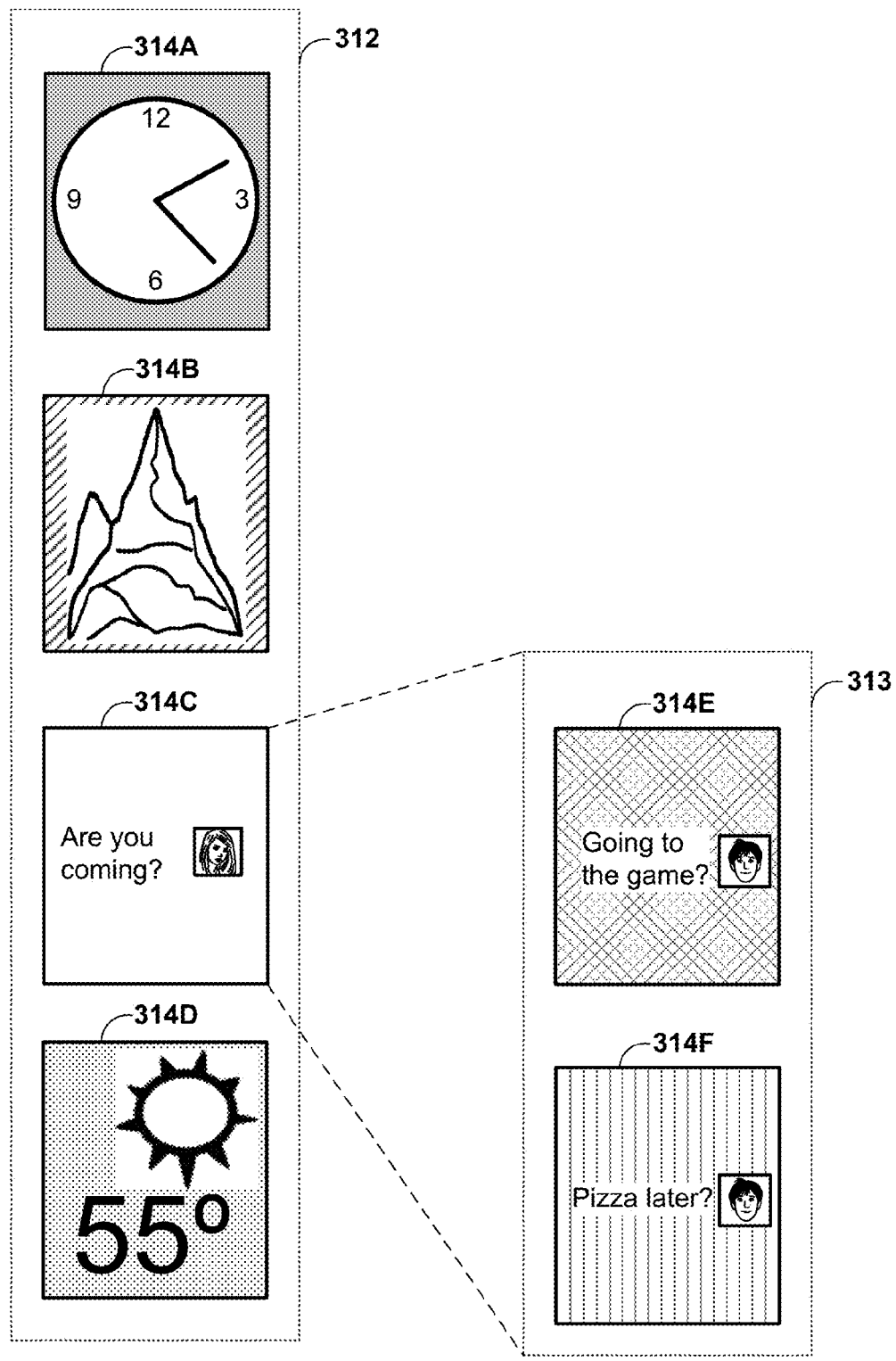
FIG. 3 is a conceptual diagram illustrating a plurality of content cards through which a device may enable user interface navigation, in accordance with one or more aspects of the present disclosure.

FIG. 3 is a conceptual diagram illustrating a plurality of content cards through which a device may enable user interface navigation, in accordance with one or more aspects of the present disclosure. Content cards 314A-314F (collectively, "content cards 314") may be examples of content cards 114 of FIG. 1. As discussed above, content cards may be included in lists, and the lists may be at different hierarchical levels. As illustrated in FIG. 3, content cards 314A-314D may be included in list 312 at a first hierarchical level with each content card generated by a different application module (see FIG. 2 application modules 244), and content cards 314E-314F may be included in list 313 at a second hierarchical level that is lower than the first hierarchical level and also generated by the same application module that generated the corresponding first hierarchical level content card 314C. A single application may also generate a multi-level hierarchical list of content cards. For example, a first hierarchical level of content cards for a media player application may be an ordered list of music albums or video collections. A second, lower level of content cards may contain an ordered list of individual songs or videos from any first-level song album or video collection. Additionally, as discussed above, content cards may have a particular order such that there may be a content card that is a "next" content card to a current content card and there may be a content card that is a "previous" content card to the current content card. As illustrated in FIG. 3, where content card 314B is the current content card, content card 314A may be the previous content card and content card 314C may be the next content card.

Figure 4B:
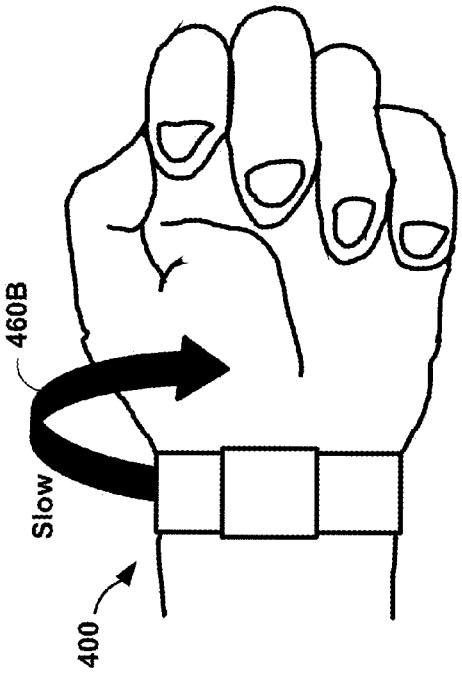
Figure 4C:
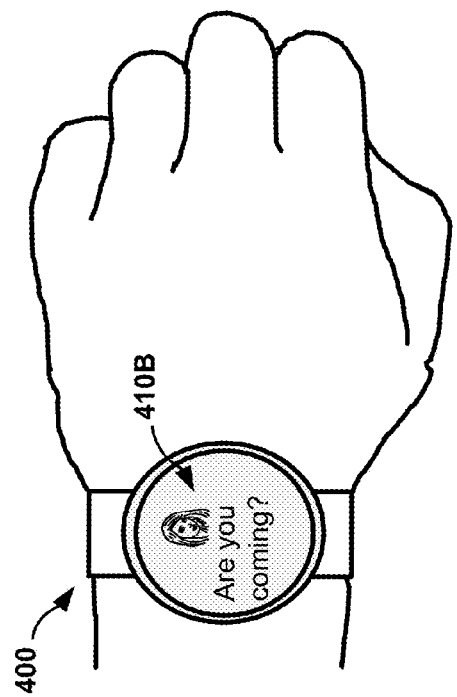
Figure 4A:
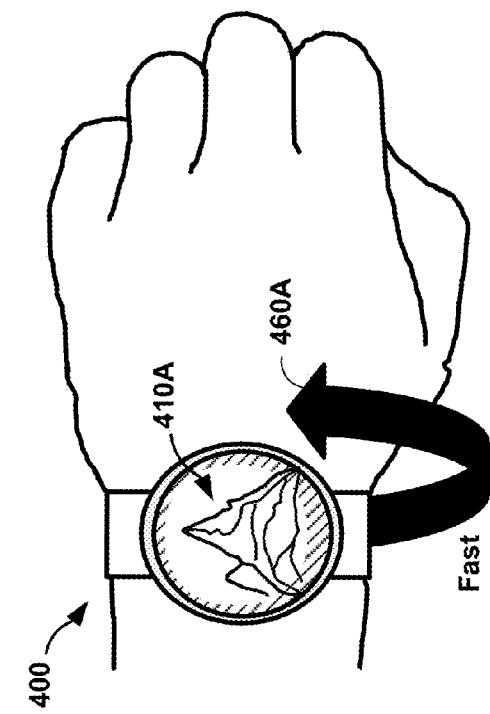
Figure 6A:
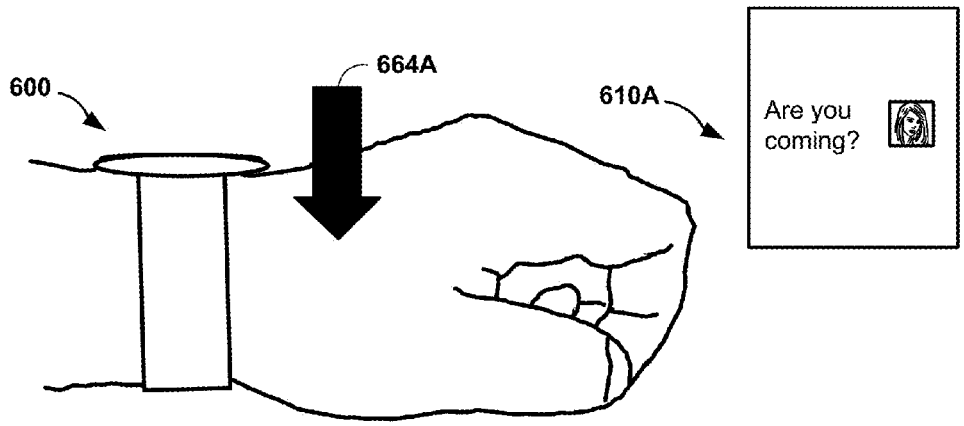
Figure 6B:
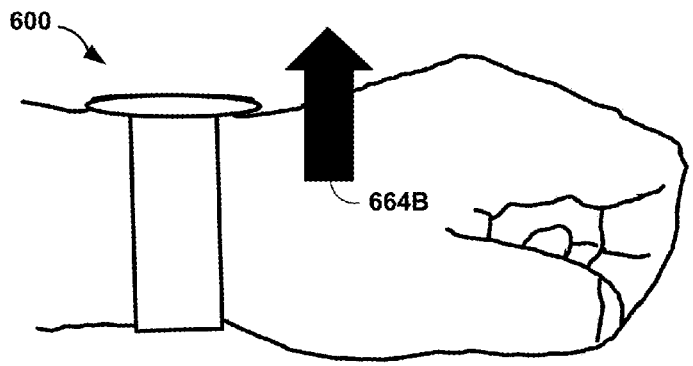
Figure 6C:
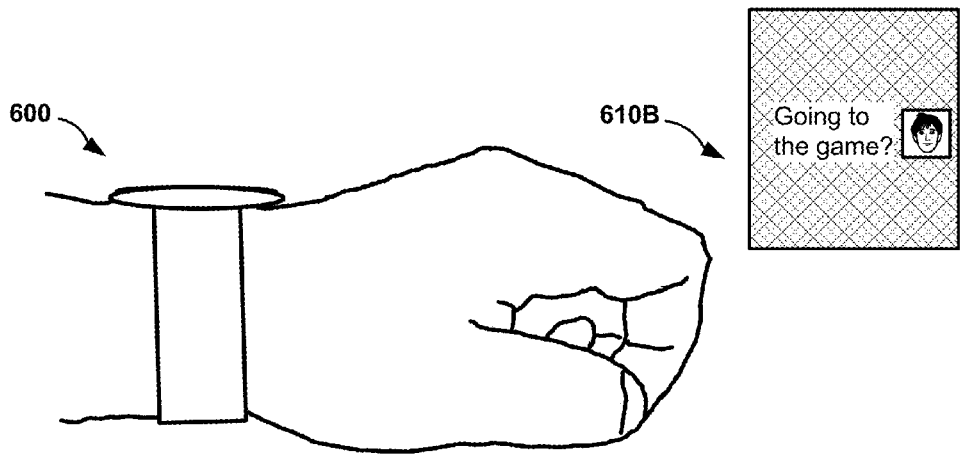
Figure 7A:
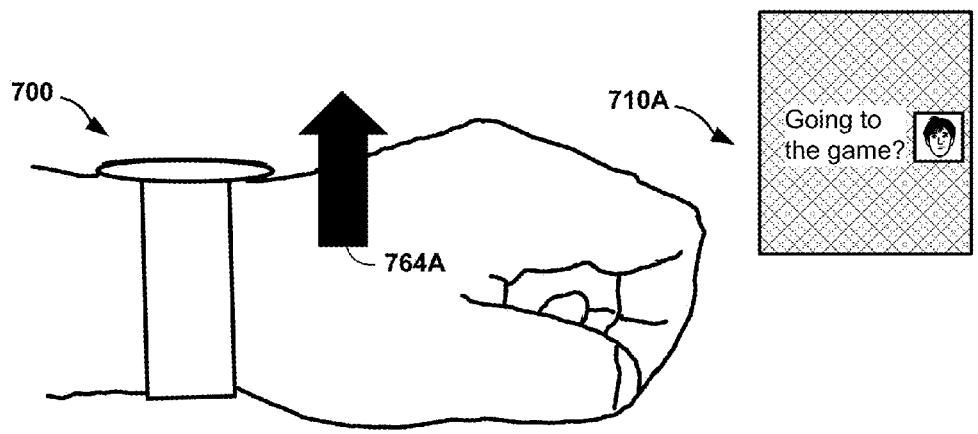
Figure 7B:
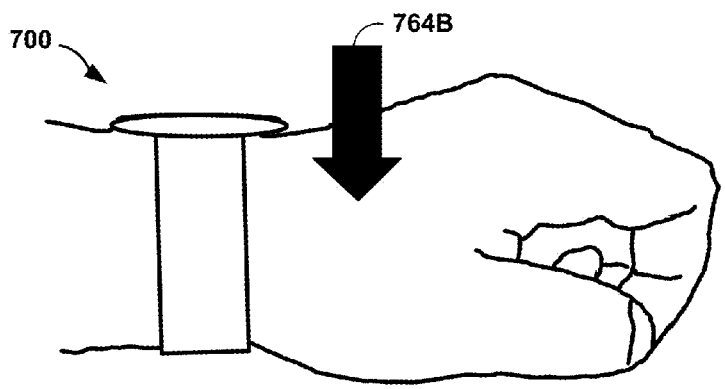

FIGS. 4A through 7B are conceptual diagrams illustrating example movements of an example wearable computing device, in accordance with one or more aspects of the present disclosure. FIGS. 4A through 4C illustrate an example movement to navigate to a next content card, FIGS. 5A through 5C illustrate an example movement to navigate to a previous content card, FIGS. 6A and 6B illustrate an example movement to navigate to a list of content cards at a lower hierarchical level, and FIGS. 7A and 7B illustrate an example movement to navigate to a list of content cards at a higher hierarchical level. FIGS. 4A through 7B are described below within the context of wearable 100 of FIG. 1 and/or wearable 200 of FIG. 2 as wearable 400/500/600/700.

FIGS. 4A and 5A illustrate views of a display (e.g., display 104/204) of wearable 400/500 as wearable 400/500 is being worn on a wrist of the user with the display of wearable 400/500 facing the user's point of view (i.e., wearable 400/500 is in the tilt orientation). From the view being shown in FIGS. 4A and 5A, wearable 400/500 may cause the display to present a user interface 410A/510A including a first content card of a plurality of content cards, such as content card 314B of FIG. 3. The user may cause wearable 400/500 to move in the direction and manner indicated by movement arrow 460A/560A. For example, the user may supinate his or her forearm, such that the display of wearable 400/500 moves from a viewable angle, to a non-viewable angle (e.g., perpendicular to the user's view).

FIGS. 4B and 5B show views of the display of wearable 400/500 as wearable 400/500 is being worn on a wrist of the user after the user supinates his or her forearm in a direction that rotates his or her wrist toward a non-viewable angle (e.g., the display projects graphical content in a direction that is perpendicular to the user's point of view). Following the movement shown in FIGS. 4B and 5B, the user may continue to cause wearable 400/500 to move by causing wearable 400/500 to move in the direction and manner indicated by movement arrow 460B/560B. For example, the user may pronate his or her forearm in the opposite direction indicated by movement arrow 460A/560A. The user may pronate his or her forearm, such that the display of wearable 400/500 moves away from a non-viewable angle, toward a viewable angle. In some examples, movement arrows 460A/560A and 460B/560B represent an uninterrupted, continuous single of wearable 400/500 such that the display of wearable 400/500 begins at a viewable angle with respect to the user's point of view, changes to a non-viewable angle with respect to the user's point of view, and reverts back to the viewable angle, all with a single motion.

FIGS. 4C and 5C show that the user may complete the movement of wearable 400/500, such that after moving wearable in the manner depicted by movement arrows 460A/560A and 460B/560B in FIGS. 4A/5A and 4B/5B, the user may cause the display of wearable 400/500 to be user facing again. Movement detection module 106/206 may obtain sensor data from one or more motion sensors 102/202 (e.g., an accelerometer, a tilt sensor, etc.) during the time when the user causes wearable 400/500 to move in the directions and in the manners indicated by movement arrows 460A/560A and 460B/560B. Movement detection module 106/206 may determine that the sensor data indicates a movement pattern or profile that corresponds to one or more predefined movements. Movement detection module 106/206 may send information to UI module 108/208 indicating that the predefined movement was detected.

While the relative motion of the movement in FIGS. 4A-4C and 5A-5C may be substantially identical, the actual movements may have one or more different characteristics that allow the wearable to determine the actual movement performed. In particular, the user may move in the manner indicated by movement arrow 460A/560A differently than in the manner indicated by movement arrow 460B/560B. For instance, in the example of FIGS. 4A-4C, the user may supinate his or her wrist (i.e., move in the manner indicated by movement arrow 460A) with a greater acceleration than the user pronates his or her wrist (i.e., move in the manner indicated by movement arrow 460B). By contrast, in the example of FIGS. 5A-5C, the user may supinate his or her wrist (i.e., move in the manner indicated by movement arrow 560A) with a lesser acceleration than the user pronates his or her wrist (i.e., move in the manner indicated by movement arrow 560B).

As such, in the example of FIGS. 4A-4C, movement detection module 106/206 may determine that the sensor data indicates that the user of wearable 400 has performed a first movement that includes a supination of the forearm of the user followed by a pronation of the forearm of the user at an acceleration that is less than an acceleration of the supination. Similarly, in the example of FIGS. 5A-5C, movement detection module 106/206 may determine that the sensor data indicates that the user of wearable 500 has performed a second movement that includes a supination of the forearm of the user followed by a pronation of the forearm of the user at an acceleration that is greater than an acceleration of the supination.

UI module 108/208 may enable the user to navigate through the content cards based on the determined movement. For instance, in response to determining that one of the predefined movements of wearable 400/500 has been identified by movement detection module 106/206, UI module 108/208 may select the content card in the corresponding navigation direction. In the example of FIGS. 4A-4C where movement detection module 106/206 determines that the user has performed a first movement that includes a supination of the forearm of the user followed by a pronation of the forearm of the user at an acceleration that is less than an acceleration of the supination, UI module 108/208 may select content card 314C as the content card in the next navigation direction and cause display 104/204 to present user interface 410B that includes content card 314C. In the example of FIGS. 5A-5C where movement detection module 106/206 determines that the user has performed a second movement that includes a supination of the forearm of the user followed by a pronation of the forearm of the user at an acceleration that is greater than an acceleration of the supination, UI module 108/208 may select content card 314A in as the content card in the previous navigation direction and cause display 104/204 to present user interface 510B that includes content card 314A. In this way, techniques of this disclosure enable a user to navigate from a current content card to a next content card or a previous content card.

FIGS. 6A and 7A show views of a display (e.g., display 104/204) of wearable 600/700 as wearable 600/700 is being worn on a wrist of the user with the display of wearable 600/700 facing the user's point of view (i.e., wearable 600/700 is in the tilt orientation). From the view being shown in FIGS. 6A and 7A, wearable 600/700 may cause the display to present a user interface 610A/710A including a content card. In the example of FIG. 6A, user interface 610A may include content card 314C of list 312 of FIG. 3 that is at a first hierarchical level. In the example of FIG. 7A, user interface 710A may include content card 314E of list 312 of FIG. 3 that is at a second, lower, hierarchical level. The user may cause wearable 600/700 to move in the direction and manner indicated by movement arrow 664A/764A. This movement may generally be performed by lifting the entire arm by pivoting at the shoulder joint. Alternatively, a similar movement may be performed by lifting only the distal end of the forearm and pivoting at the elbow. One of these gestures, either of these gestures, or a combination of both of these gestures, may support user interface navigation. In the example of FIG. 6A, the user may lower his or her forearm away from his or her head, such that the display of wearable 600 moves further away in the user's view. In the example of FIG. 7A, the user may raise his or her forearm toward from his or her head, such that the display of wearable 700 moves closer in the user's view.

FIGS. 6B and 7B show views of the display of wearable 600/700 as wearable 600/700 is being worn on a wrist of the user after the user lowers his or her forearm away from his or her head. Following the movement shown in FIGS. 6B and 7B, the user may continue to cause wearable 600/700 to move by causing wearable 600/700 to move in the direction and manner indicated by movement arrow 764B/764B. In the example of FIG. 6A, the user may raise his or her forearm toward from his or her head, such that the display of wearable 600 moves closer in the user's view. In the example of FIG. 7A, the user may lower his or her forearm away from his or her head, such that the display of wearable 700 moves further away in the user's view. In some examples, movement arrows 664A/764A and 664B/764B represent an uninterrupted, continuous single of wearable 600/700 such that the display of wearable 600/700 begins at a point within the user's view, moves away from the point, and reverts back to the point within the user's view, all with a single motion.

Figure 7C:
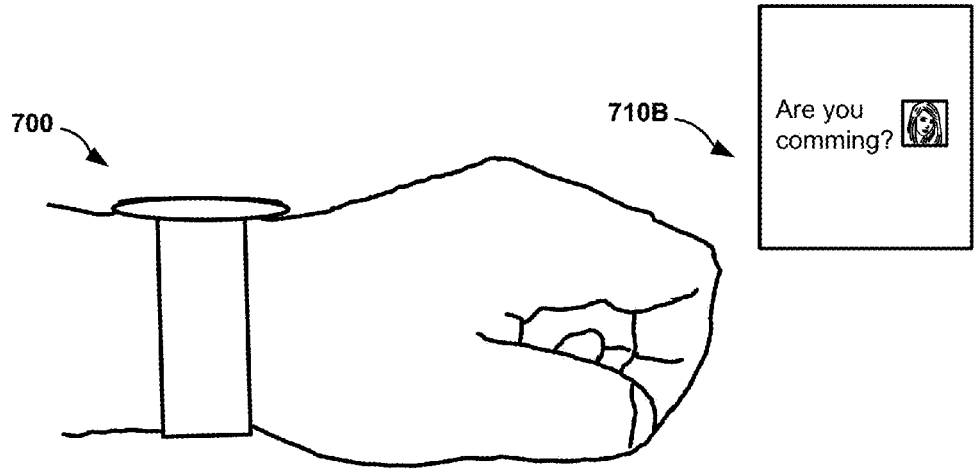

FIGS. 6C and 7C show that the user may complete the movement of wearable 600/700, such that after moving wearable in the manner depicted by movement arrows 664A/764A and 664B/764B in FIGS. 6A/7A and 6B/7B, the user may cause the display of wearable 600/700 to return to the starting position. Movement detection module 106/206 may obtain sensor data from one or more motion sensors 102/202 (e.g., an accelerometer, a tilt sensor, etc.) during the time when the user causes wearable 600/700 to move in the directions and in the manners indicated by movement arrows 664A/764A and 664B/764B. Movement detection module 106/206 may determine that the sensor data indicates a movement pattern or profile that corresponds to one or more predefined movements. Movement detection module 106/206 may send information to UI module 108/208 indicating that the predefined movement was detected.

In the example of FIGS. 6A-6C, movement detection module 106/206 may determine that the sensor data indicates that the user of wearable 600 has performed a third movement that includes a lowering of the forearm of the user away from a head of the user followed by a raising of the forearm of the user toward the head of the user. Similarly, in the example of FIGS. 7A-7C, movement detection module 106/206 may determine that the sensor data indicates that the user of wearable 700 has performed a fourth movement that includes a raising of the forearm of the user towards the head of the user followed by a lowering of the forearm of the user away from the head of the user.

UI module 108/208 may enable the user to navigate through the content cards based on the determined movement. For instance, in response to determining that one of the predefined movements of wearable 600/700 has been identified by movement detection module 106/206, UI module 108/208 may select the content card in the corresponding navigation direction. In the example of FIGS. 6A-6C where movement detection module 106/206 determines that the user has performed a third movement that includes a lowering of the forearm of the user away from a head of the user followed by a raising of the forearm of the user toward the head of the user, UI module 108/208 may select content card 314E as the content card in the into navigation direction (i.e., a content card from the list of content cards at a lower hierarchical level that corresponds to the current content card) and cause display 104/204 to present user interface 610B that includes content card 314E. In the example of FIGS. 7A-7C where movement detection module 106/206 determines that the user has performed a fourth movement that includes a raising of the forearm of the user towards the head of the user followed by a lowering of the forearm of the user away from the head of the user, UI module 108/208 may select content card 314C in as the content card in the out navigation direction (i.e., a content card from the list of content cards at a higher hierarchical level) and cause display 104/204 to present user interface 710B that includes content card 314C. In this way, techniques of this disclosure enable a user to navigate between hierarchical lists of content cards.

Figure 8:
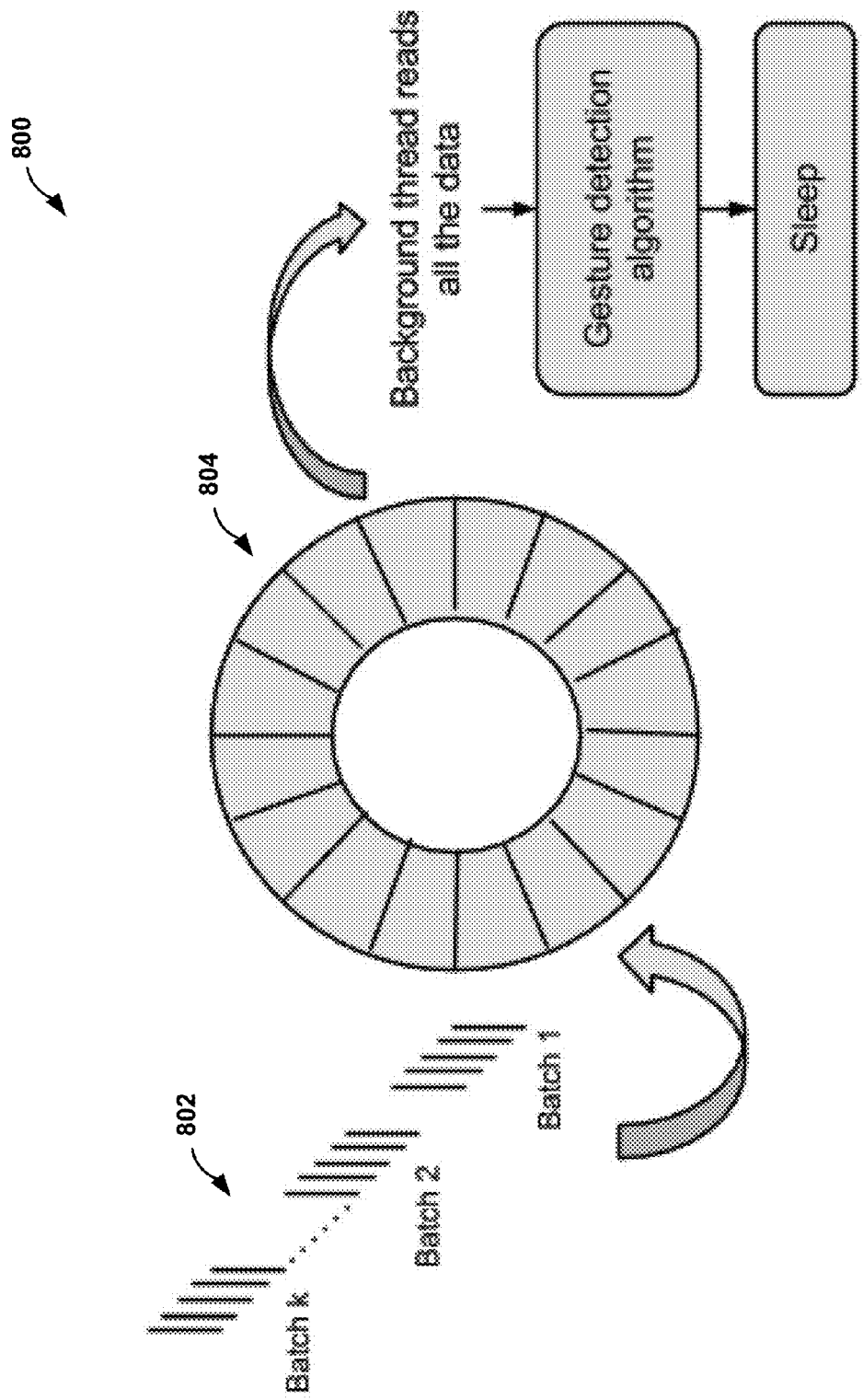
FIG. 8 is a conceptual diagram illustrating details of one example of a data ingestion technique, in accordance with one or more aspects of the disclosure.

FIG. 8 is a conceptual diagram illustrating details of one example of a data ingestion technique, in accordance with one or more aspects of the disclosure. Data ingestion technique 800 may be performed by a data ingestion module, such as data ingestion module 249 of FIG. 2. For purposes of illustration, data ingestion technique 800 will be described within the context of data ingestion module 249 of FIG. 2.

When called (e.g., by UI module 208), data ingestion module 249 may begin reading motion data 802 from motion sensors 202. Data ingestion module 249 may execute as a part of a main thread of movement detection module 206 and a background thread of movement detection module 206. The portions of data ingestion module 249 that execute as part of the main thread may write motion data 802 to synchronized circular buffer 804 and the portions of data ingestion module 249 that execute as part of the background thread may read the data from circular buffer 804.

In according with one or more techniques of this disclosure, one or more optimizations may be made to reduce the amount of power consumed by data ingestion module 249. For example, data ingestion module 249 may read the motion data in the batching mode. As another example, the background thread may not be run constantly. After the background thread is done processing one buffer read, the background thread may go to "sleep" (i.e., to reduce the amount of power consumed). The background thread may wake-up only when new data arrives that is fresher than the already processed data. However, further optimization may be possible. In particular, in examples where the background thread reads the whole circular buffer and processes all the data, such techniques may results in a repeated calculation on almost 90% of the data since only 10% of the data is new for every batch of sensor measurement coming in. Thus, there may be opportunities to process a sub-set of the circular buffer and/or process the entire circular buffer only at certain time periods or after a certain amount of new sensor data has arrived.

Figure 9:
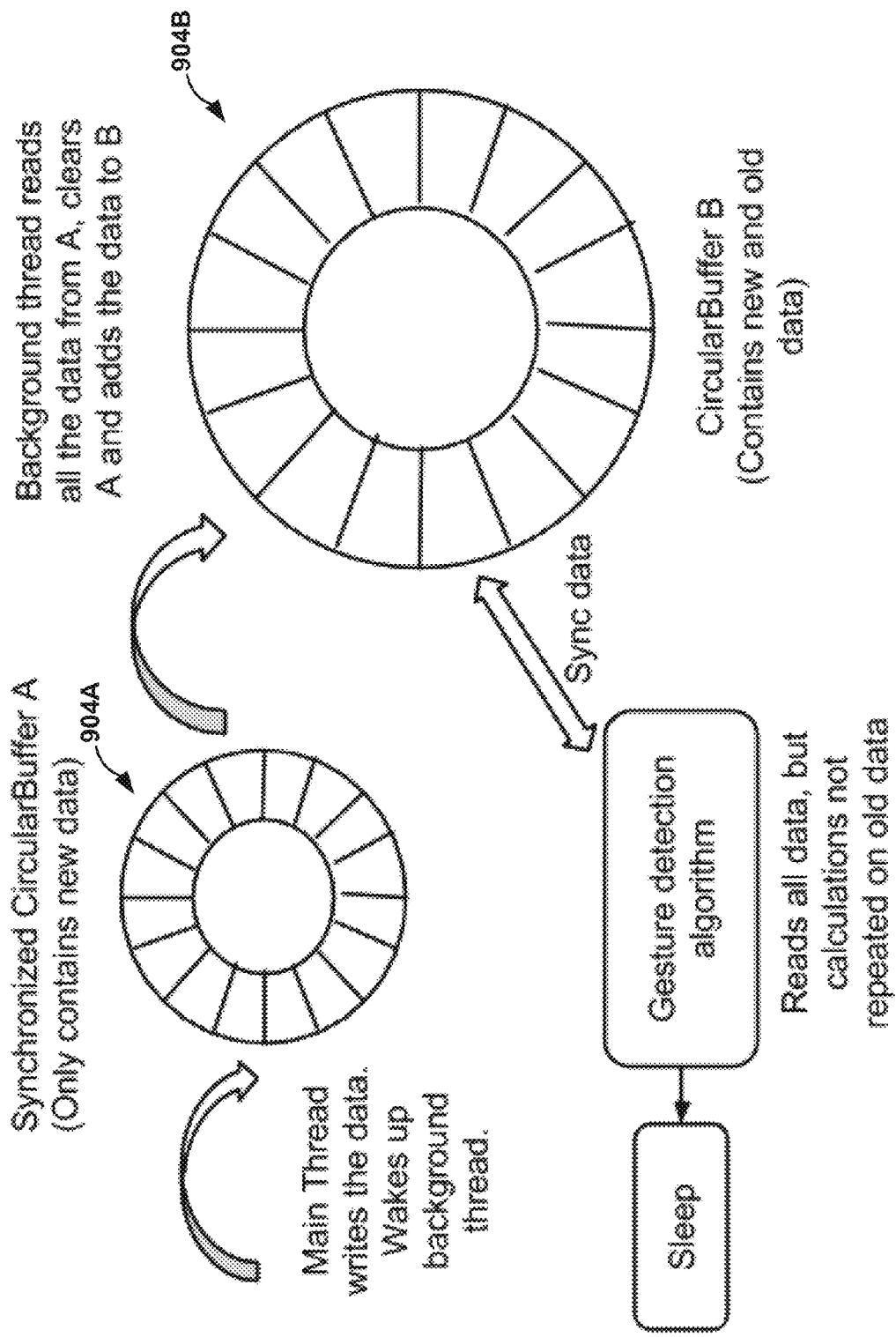
FIG. 9 is a conceptual diagram illustrating details of another example of a data ingestion technique, in accordance with one or more aspects of the disclosure.

FIG. 9 is a conceptual diagram illustrating details of another example of a data ingestion technique, in accordance with one or more aspects of the disclosure. Data ingestion technique 900 may be performed by a data ingestion module, such as data ingestion module 249 of FIG. 2. For purposes of illustration, data ingestion technique 900 will be described within the context of data ingestion module 249 of FIG. 2.

In accordance with one or more techniques of this disclosure, data ingestion module 249 may separate the writing and reading circular buffers such that the gesture detection is run only on new data. For instance, as opposed to using single synchronized circular buffer 804 of FIG. 8, data ingestion module 249 may use first synchronized circular buffer 904A and second synchronized circular buffer 904B to perform data ingestion. In data ingestion technique 900, the writer thread may write to first synchronized circular buffer 904A, as previously, however, the background (reader) thread may have all the data in second circular buffer 904B. The reader thread may read the data from first synchronized circular buffer 904A and clear out the data in first synchronized circular buffer 904A. That way, next time the writer thread writes the data, only new data is contained in first synchronized circular buffer 904A. However, as there may be gestures that are longer than just the new data, it may be necessary to access the earlier data. As such, the background worker thread may use second synchronized circular buffer 904B that contains the new and the old data. The gesture detection algorithm (e.g., as performed by transform module 252, feature module 254, and classification module 256) may read all the data from second synchronized circular buffer 904B however each part of the algorithm now "syncs" to second synchronized circular buffer 904B to identify only the new data. The algorithm in essence only performs calculations on the new data since the data structure containing second synchronized circular buffer 904B can keep track of the new data. In this way, the amount of power used to ingest data may be reduced.

Figure 10:
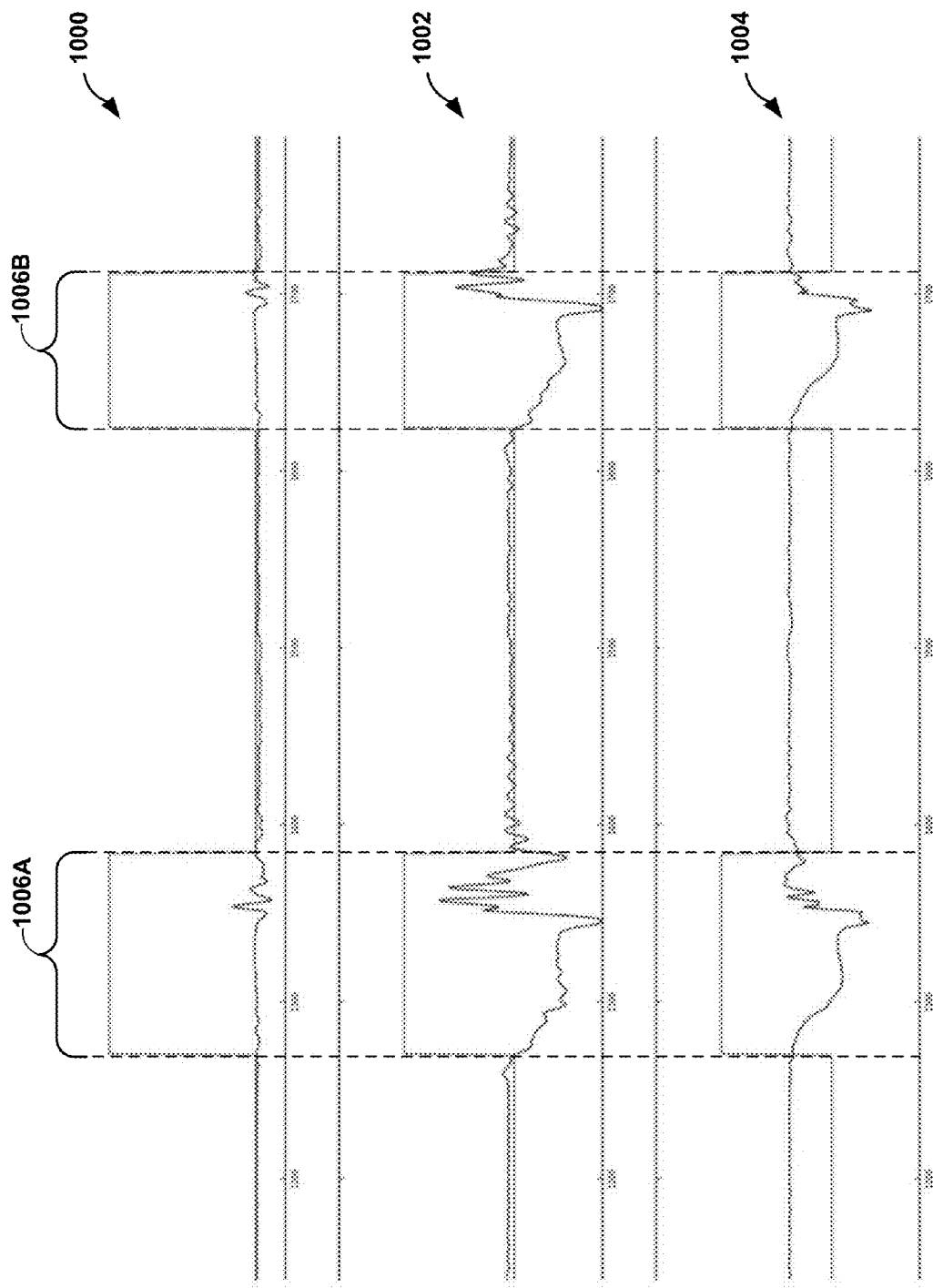
FIG. 10 is a graph illustrating example motion data generated by a motion sensor of a wearable computing device as a function of time, in accordance with one or more techniques of the present disclosure.

FIG. 10 is a graph illustrating example motion data generated by a motion sensor of a wearable computing device as a function of time, in accordance with one or more techniques of the present disclosure. In some examples, the motion data illustrated by graph 1000 of FIG. 10 may correspond to X-axis motion data, the motion data illustrated by graph 1002 of FIG. 10 may correspond to Y-axis motion data, and the motion data illustrated by graph 1004 of FIG. 10 may correspond to Z-axis motion data generated by motion sensors 202 of wearable 200 of FIG. 2.

As discussed above, segmentation module 250 of wearable 200 may determine a segment of motion data as a series of values of motion data that have one or more properties. A first example property of a segment is that the amount of variation in measured values of raw motion data (e.g., raw accelerometer data) on y-axis is high. A second example property is that a segment starts in tilt orientation (i.e., the range of values that indicate the user is viewing display component 204) and ends in tilt orientation. A third example property is that each segment has a temporal duration that is between a predefined minimum duration and a predefined maximum duration. Based on one or more of the above identified properties, in some examples, segmentation module 250 may determine one or more segments of motion data by searching for a point within the motion data that has a high standard deviation on the y-axis (i.e., to satisfy the first example property). If the point that has the high standard deviation on the y-axis is within a certain range of the value at tilt orientation (i.e., to satisfy the second example property), segmentation module 250 may assign the point as a possible segment start index and may search for a segment end index. In some examples, the end index may be a point on the motion data (temporally after the start index) with low standard deviation (i.e., to satisfy the first example property). A point is assigned to be the segment end point if the point is in tilt orientation (i.e., to satisfy the second example property).

In the example of FIG. 10, segmentation module 250 may determine that the series of values within time period 1006A are a first segment and that the series of values within time period 1006B are a second segment. In this way, segmentation module 250 may determine segments from motion data.

In some examples, the data points (motion vectors) near the end of the segments had little impact on feature detection, and therefore gesture detection. As such, in accordance with one or more techniques of this disclosure, segmentation module 250 may determine segments that end before the true segment ending. For instance, if segmentation module 250 ends the segments 20% to 25% before what was labelled as true segment ending, a gain on latency may be achieved without any compromise on quality. For instance, segmentation module 250 may determine the same start points for the segments but determine end points that are 20% to 20% earlier. In this way, the techniques of this disclosure may reduce the amount of time needed to detect gestures/movements.

Figure 11A:
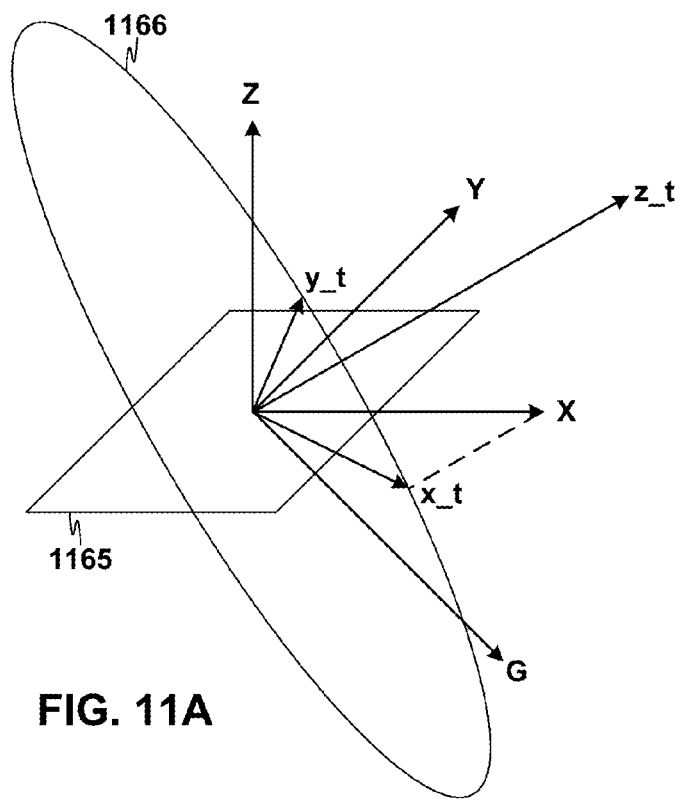
FIGS. 11A and 11B are conceptual diagrams illustrating conversion of motion data from a first coordinate system into a second, task-specific, coordinate system, in accordance with one or more techniques of the present disclosure.
Figure 11B:
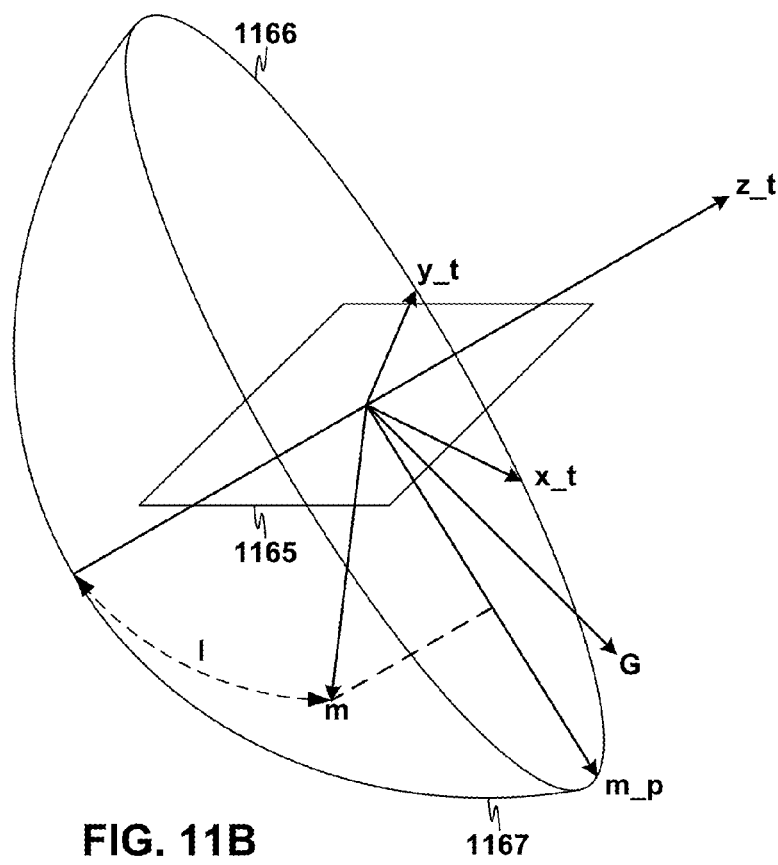

FIGS. 11A and 11B are conceptual diagrams illustrating conversion of motion data from a first coordinate system into a second, task-specific, coordinate system, in accordance with one or more techniques of the present disclosure. As illustrated by FIGS. 11A, X, Y, and Z may represent the X, Y, and Z axes of a motion sensor included in a wearable device, such as motion sensor 202 of wearable 200 of FIG. 2. Also as illustrated in FIG. 7A, the Z axis may be normal to the surface of a display of wearable computing device 200 (e.g., display component 204), the Y axis may be parallel to the horizontal dimension of the display, and the X axis may be parallel to the vertical dimension of the display.

In accordance with one or more techniques of this disclosure, a wearable computing device, such as wearable 200, may convert motion data from a first coordinate system into a second, task-specific, coordinate system. As one example, transform module 252 may convert motion data generated by motion sensors 202 into a gaze-centric coordinate system. The vector $z\_t$ may be defined as the typical orientation of gravity vector G while a user is interacting with wearable computing device 200 (i.e., while the user is "gazing" at a display of wearable computing device 200). Based on $z\_t$, the vectors $x\_t$ and $y\_t$ may be defined. For instance, the vector $x\_t$ may be defined by projecting the X axis onto a plane orthogonal to $z\_t$ (circle 1166 may be a circle of unit length on the plane centered at $x\_t=y\_t=z\_t=0$), and the vector $y\_t$ may be selected to be a vector orthogonal to $z\_t$ and $x\_t$ (e.g., such that $x\_t$, $y\_t$, and $z\_t$ form a right-handed orthonormal system).

In operation, transform module 252 may convert motion vectors including x,y,z values (corresponding to the X, Y, and Z axes) into u,v coordinates. Transform module 252 may normalize the x,y,z values of a motion vector into unit length to determine motion vector m. Transform module 252 may determine vector motion vector $m\_p$ by projecting motion vector m on to plane 1165 and extending the result to unit length (i.e., to intersect with circle 1166). Transform module 252 may determine u', an intermediate value for the u coordinate, by projecting motion vector $m\_p$ onto $x\_t$ (i.e., $u'=m\_p \cdot x\_t$), and v', an intermediate value for the v coordinate, by projecting motion vector $m\_p$ onto $y\_t$ (i.e., $v'=m\_p \cdot y\_t$). As illustrated in FIG. 11B, transform module 252 may determine an l value as the distance (e.g., the geodesic distance) between m and the nearest intersection of $z\_t$ and a sphere centered at $x\_t=y\_t=z\_t=0$ (i.e., the sphere that includes hemisphere 1167 and the complimentary hemisphere). Transform module 252 may determine the u,v coordinates by scaling the intermediate coordinates by the determined l value (i.e., $u=l*u'$ and $v=l*v'$). In this way, transform module 252 may convert motion vectors into a task-specific (e.g., a gaze-centric) coordinate system.

Figure 12:
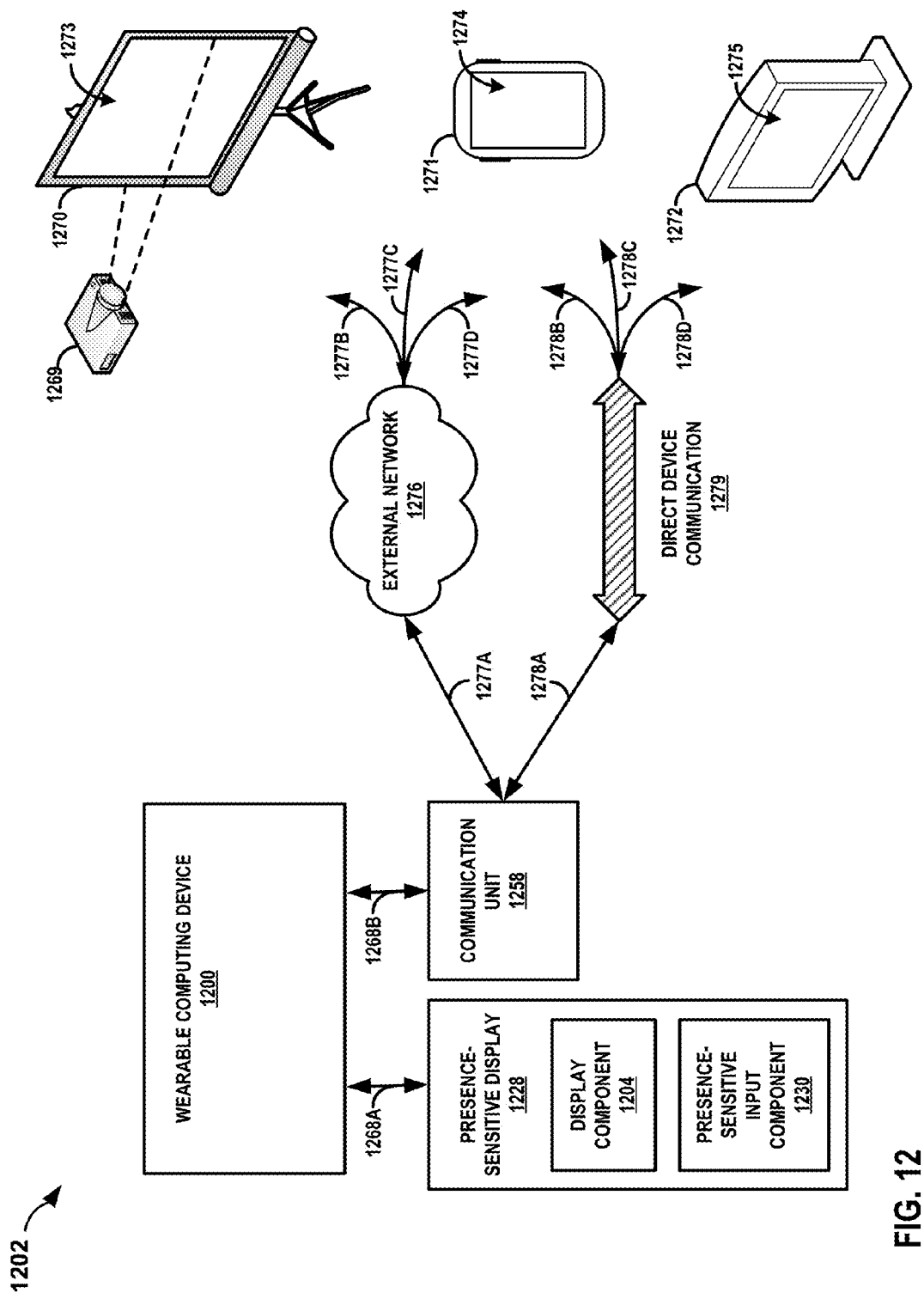
FIG. 12 is a block diagram illustrating an example computing device that outputs graphical content for display at a remote device, in accordance with one or more techniques of the present disclosure.

FIG. 12 is a block diagram 1202 illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 12 includes a wearable computing device 1200, presence-sensitive display 1228, communication unit 1258, projector 1269, projector screen 1270, mobile device 1271, and visual display device 1272. Although shown for purposes of example in FIGS. 1 and 2 as a stand-alone wearable 100 and 200, a wearable computing device such as wearable computing device 1200 may, generally, be any component or system that includes a processor or other suitable computing environment for executing software instructions and, for example, need not include a presence-sensitive display.

As shown in the example of FIG. 12, computing device 1200 may be a processor that includes functionality as described with respect to processor 222 in FIG. 2. In such examples, wearable 1200 may be operatively coupled to presence-sensitive display 1228 by a communication channel 1268A, which may be a system bus or other suitable connection. Wearable 1200 may also be operatively coupled to communication unit 1258, further described below, by a communication channel 1268B, which may also be a system bus or other suitable connection. Although shown separately as an example in FIG. 12, wearable 1200 may be operatively coupled to presence-sensitive display 1228 and communication unit 1258 by any number of one or more communication channels.

In other examples, such as illustrated previously by wearable 100 in FIG. 1 and wearable 200 in FIG. 2, a computing device may refer to a portable or mobile device such as a mobile phone (including smart phone), laptop computer, smartwatch, etc. In some examples, a computing device may be a desktop computer, tablet computer, smart television platform, gaming console, remote controller, electronic camera, personal digital assistant (PDA), server, mainframe, etc.

Presence-sensitive display 1228, like presence-sensitive display 228 as shown in FIG. 2, may include display component 1204 and presence-sensitive input component 1230. Display component 1204 may, for example, receive data from computing device 1200 and display the graphical content. In some examples, presence-sensitive input component 1230 may determine one or more user inputs (e.g., continuous gestures, multi-touch gestures, single-touch gestures, etc.) at presence-sensitive display 1228 using capacitive, inductive, and/or optical recognition techniques and send indications of such user input to computing device 1200 using communication channel 1268A. In some examples, presence-sensitive input component 1230 may be physically positioned on top of display component 1204 such that, when a user positions an input unit over a graphical element displayed by display component 1204, the location at which presence-sensitive input component 1230 corresponds to the location of display component 1204 at which the graphical element is displayed. In other examples, presence-sensitive input component 1230 may be positioned physically apart from display component 1204, and locations of presence-sensitive input component 1230 may correspond to locations of display component 1204, such that input can be made at presence-sensitive input component 1230 for interacting with graphical elements displayed at corresponding locations of display component 1204.

As shown in FIG. 12, wearable 1200 may also include and/or be operatively coupled with communication unit 1258. Examples of communication unit 1258 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Wearable 1200 may also include and/or be operatively coupled with one or more other devices, e.g., input devices, output devices, memory, storage devices, etc. that are not shown in FIG. 12 for purposes of brevity and illustration.

FIG. 12 also illustrates a projector 1269 and projector screen 1270. Other such examples of projection devices may include electronic whiteboards, holographic display devices, and any other suitable devices for displaying graphical content. Projector 1269 and projector screen 1270 may include one or more communication units that enable the respective devices to communicate with wearable 1200. In some examples, the one or more communication units may enable communication between projector 1269 and projector screen 1270. Projector 1269 may receive data from wearable 1200 that includes graphical content, such as one or more content cards. Projector 1269, in response to receiving the data, may project the graphical content onto projector screen 1270. In some examples, projector 1269 may determine one or more user inputs (e.g., continuous gestures, multi-touch gestures, single-touch gestures, etc.) at projector screen using optical recognition or other suitable techniques and send indications of such user input using one or more communication units to wearable 1200. In such examples, projector screen 1270 may be unnecessary, and projector 1269 may project graphical content on any suitable medium and detect one or more user inputs using optical recognition or other such suitable techniques.

Projector screen 1270, in some examples, may include a presence-sensitive display 1273. Presence-sensitive display 1273 may include a subset of functionality or all of the functionality of presence-sensitive display 1228 as described in this disclosure. In some examples, presence-sensitive display 1273 may include additional functionality. Projector screen 1270 (e.g., an electronic whiteboard), may receive data from wearable 1200 and display the graphical content. In some examples, presence-sensitive display 1273 may determine one or more user inputs (e.g., continuous gestures, multi-touch gestures, single-touch gestures, etc.) at projector screen 1270 using capacitive, inductive, and/or optical recognition techniques and send indications of such user input using one or more communication units to wearable 1200.

FIG. 12 also illustrates mobile device 1271 and visual display device 1272. Mobile device 1271 and visual display device 1272 may each include computing and connectivity capabilities. Examples of mobile device 1271 may include e-reader devices, convertible notebook devices, hybrid slate devices, etc. Examples of visual display device 1272 may include other semi-stationary devices such as televisions, computer monitors, etc. As shown in FIG. 12, mobile device 1271 may include a presence-sensitive display 1274. Visual display device 1272 may include a presence-sensitive display 1275. Presence-sensitive displays 1274, 1275 may include a subset of functionality or all of the functionality of presence-sensitive display 1228 as described in this disclosure. In some examples, presence-sensitive displays 1274, 1275 may include additional functionality. In any case, presence-sensitive display 1275, for example, may receive data from wearable 1200 and display the graphical content. In some examples, presence-sensitive display 1275 may determine one or more user inputs (e.g., continuous gestures, multi-touch gestures, single-touch gestures, etc.) at projector screen using capacitive, inductive, and/or optical recognition techniques and send indications of such user input using one or more communication units to wearable 1200.

As described above, in some examples, wearable 1200 may output graphical content for display at presence-sensitive display 1228 that is coupled to wearable 1200 by a system bus or other suitable communication channel. Wearable 1200 may also output graphical content for display at one or more remote devices, such as projector 1269, projector screen 1270, mobile device 1271, and visual display device 1272. For instance, wearable 1200 may execute one or more instructions to generate and/or modify graphical content in accordance with techniques of the present disclosure. Wearable 1200 may output the data that includes the graphical content to a communication unit of wearable 1200, such as communication unit 1258. Communication unit 1258 may send the data to one or more of the remote devices, such as projector 1269, projector screen 1270, mobile device 1271, and/or visual display device 1272. In this way, wearable 1200 may output the graphical content for display at one or more of the remote devices. In some examples, one or more of the remote devices may output the graphical content at a presence-sensitive display that is included in and/or operatively coupled to the respective remote devices.

In some examples, wearable 1200 may not output graphical content at presence-sensitive display 1228 that is operatively coupled to wearable 1200. In other examples, wearable 1200 may output graphical content for display at both a presence-sensitive display 1228 that is coupled to wearable 1200 by communication channel 1268A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by wearable 1200 and output for display at presence-sensitive display 1228 may be different than graphical content display output for display at one or more remote devices.

Wearable 1200 may send and receive data using any suitable communication techniques. For example, wearable 1200 may be operatively coupled to external network 1276 using network link 1277A. Each of the remote devices illustrated in FIG. 12 may be operatively coupled to network external network 1276 by one of respective network links 1277B, 1277C, and 1277D. External network 1276 may include network hubs, network switches, network routers, etc., that are operatively inter-coupled thereby providing for the exchange of information between wearable 1200 and the remote devices illustrated in FIG. 12. In some examples, network links 1277A-1277D may be Ethernet, ATM or other network connections. Such connections may be wireless and/or wired connections.

In some examples, wearable 1200 may be operatively coupled to one or more of the remote devices included in FIG. 12 using direct device communication 1279. Direct device communication 1279 may include communications through which wearable 1200 sends and receives data directly with a remote device, using wired or wireless communication. That is, in some examples of direct device communication 1279, data sent by wearable 1200 may not be forwarded by one or more additional devices before being received at the remote device, and vice-versa. Examples of direct device communication 1279 may include Bluetooth, Near-Field Communication, Universal Serial Bus, WiFi, infrared, etc. One or more of the remote devices illustrated in FIG. 12 may be operatively coupled with wearable 1200 by communication links 1278A-1278D. In some examples, communication links 1278A-1278D may be connections using Bluetooth, Near-Field Communication, Universal Serial Bus, infrared, etc. Such connections may be wireless and/or wired connections.

In accordance with techniques of the disclosure, wearable 1200 may be operatively coupled to mobile device 1271 using external network 1276. Wearable 1200 may output for display at presence-sensitive display 1275, a content card of a list of content cards. For instance, wearable 1200 may send data that includes a representation of the content card to communication unit 1258. Communication unit 1258 may send the data that includes the representation of the content card to mobile device 1271 using external network 1276. Mobile device 1271, in response to receiving the data using external network 1276, may cause presence-sensitive display 1274 to output the content card.

As discussed above, wearable 1200 may enable a user to navigate through content cards by performing one or more gestures. In response to determining that the user of wearable 1200 has performed a gesture to move to a next content card, wearable 1200 may output for display at presence-sensitive display 1275, a next content card of the list of content cards. For instance, wearable 1200 may send data that includes a representation of the next content card to communication unit 1258. Communication unit 1258 may send the data that includes the representation of the next content card to mobile device 1271 using external network 1276. Mobile device 1271, in response to receiving the data using external network 1276, may cause presence-sensitive display 1274 to output the next content card.

Figure 13:
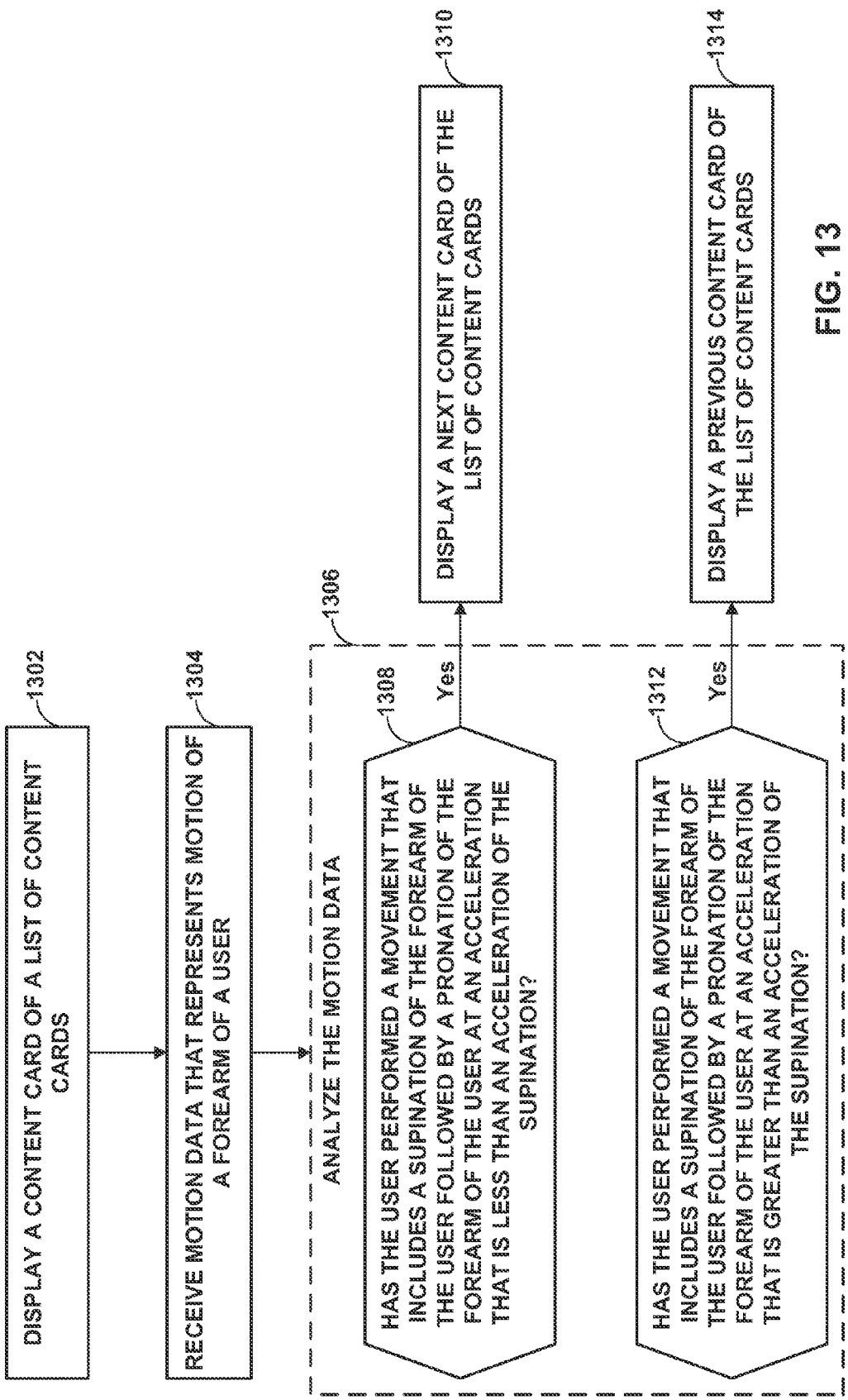
FIG. 13 is a flow diagram illustrating example operations of a wearable computing device that performs actions based on motion data, in accordance with one or more techniques of the present disclosure.

FIG. 13 is a flow diagram illustrating example operations of a wearable computing device that performs actions based on motion data, in accordance with one or more techniques of the present disclosure. The techniques of FIG. 13 may be performed by one or more processors of a wearable computing device, such as wearable 100 illustrated in FIG. 1 or wearable 200 illustrated in FIG. 2. For purposes of illustration, the techniques of FIG. 13 are described within the context of wearable computing device 100 of FIG. 1, although computing devices having configurations different than that of wearable computing device 100 may perform the techniques of FIG. 13.

In accordance with one or more techniques of the disclosure, a display of wearable 100 may display (1302) a content card of a list of content cards. For instance, display 104 may present user interface 110A that includes content card 114B of list 112 of content cards 114.

Wearable 100 may receive (1304) motion data that represents motion of a forearm of a user of wearable 100. For instance, one or more of motion sensors 102 (e.g., an accelerometer) may generate, and movement detection module 106 may receive, a plurality of motion vectors that each indicate a respective acceleration value for an X-axis, a Y-axis, and a Z-axis.

Wearable 100 may analyze (1306) the received motion data. Wearable 100 may determine whether (1308) the user has performed a movement that includes a supination of the forearm of the user followed by a pronation of the forearm of the user at an acceleration that is less than an acceleration of the supination. In response to determining that the user has performed a movement that includes a supination of the forearm of the user followed by a pronation of the forearm of the user at an acceleration that is less than an acceleration of the supination ("Yes" branch of 1308), wearable 100 may display a next content card of the list of content cards. For instance, display 104 may present user interface 110B that includes content card 114C of list 112 of content cards 114.

Wearable 100 may determine whether (1312) the user has performed a movement that includes a supination of the forearm of the user followed by a pronation of the forearm of the user at an acceleration that is greater than an acceleration of the supination. In response to determining that the user has performed a movement that includes a supination of the forearm of the user followed by a pronation of the forearm of the user at an acceleration that is greater than an acceleration of the supination ("Yes" branch of 1312), wearable 100 may display a previous content card of the list of content cards.

The following numbered examples may illustrated one or more aspects of the present disclosure.

Example 1

A method comprising: displaying, by a display of a wearable computing device, a content card of a list of content cards; receiving, by the wearable computing device, motion data generated by a motion sensor of the wearable computing device that represents motion of a forearm of a user of the wearable computing device; in response to determining, by the wearable computing device and based on the motion data, that the user of the wearable computing device has performed a first movement that includes a supination of the forearm of the user followed by a pronation of the forearm of the user at an acceleration that is less than an acceleration of the supination, displaying, by the display, a next content card of the list of content cards; and in response to determining, by the wearable computing device and based on the motion data, that the user of the wearable computing device has performed a second movement that includes a supination of the forearm of the user followed by a pronation of the forearm of the user at an acceleration that is greater than an acceleration of the supination, displaying, by the display, a previous content card of the list of content cards.

Example 2

The method of example 1, wherein the list of content cards is at a current hierarchical level of a plurality of hierarchical levels, and wherein the current content card corresponds to a list of content cards at a lower hierarchical level of the plurality of hierarchical levels than the current hierarchical level, the method further comprising: in response to determining, by the wearable computing device and based on the motion data, that the user of the wearable computing device has performed a third movement that includes a lowering of at least a distal end of the forearm of the user away from a head of the user followed by a raising of at least the distal end of the forearm of the user toward the head of the user, displaying, by the display, a content card of the list of content cards at the lower hierarchical level.

Example 3

The method of any combination of examples 1-2, further comprising: in response to determining, by the wearable computing device and based on the motion data, that the user of the wearable computing device has performed a fourth movement that includes a raising of at least a distal end of the forearm of the user towards the head of the user followed by a lowering of at least the distal end of the forearm of the user away from the head of the user, displaying, by the display, a content card of a list of content cards at a higher hierarchical level of the plurality of hierarchical levels than the current hierarchical level.

Example 4

The method of any combination of examples 1-3, further comprising: in response to determining, by the wearable computing device and based on the motion data, that the user of the wearable computing device has performed a fifth movement that includes a repeated pronation and supination of the forearm of the user within a period of time, displaying, by the display, a home screen.

Example 5

The method of any combination of examples 1-4, wherein the home screen is a content card of the list of content cards that is not the next content card, the previous content card, or a currently displayed content card.

Example 6

A wearable computing device configured to be worn on a forearm of a user, the wearable computing device comprising; a display component that displays content cards; at least one motion sensor that detects movement of the wearable computing device and generates, based on the movement, motion data that represents motion of the forearm of the user of the wearable computing device; one or more processors; at least one module operable by the one or more processors to: cause the display component to display a first content card of a list of content cards; responsive to determining that the user of the wearable computing device has performed a first gesture that includes a supination of the forearm of the user followed by a pronation of the forearm of the user at an acceleration that is less than an acceleration of the supination, output, for display by the display component, a second content card of the list of content cards; and responsive to determining, based on the motion data, that the user of the wearable computing device has performed a second gesture that includes a supination of the forearm of the user followed by a pronation of the forearm of the user at an acceleration that is greater than an acceleration of the supination, output, for display by the display component, the first content card.

Example 7

The wearable computing device of example 6, wherein the first content card corresponds to a current hierarchical level of a plurality of hierarchical levels, wherein, responsive to determining, based on the motion data, that the user of the wearable computing device has performed a third movement that includes a lowering of at least a distal end of the forearm of the user away from a head of the user followed by a raising of at least the distal end of the forearm of the user toward the head of the user, the at least one module is further operable to output, for display by the display component, a third content card from a lower hierarchical level than the current hierarchical level.

Example 8

The wearable computing device of any combination of examples 6-7, wherein, in response to determining, based on the motion data, that the user of the wearable computing device has performed a fourth movement that includes a raising of at least a distal end of the forearm of the user towards the head of the user followed by a lowering of at least the distal end of the forearm of the user away from the head of the user, the at least one module is further operable to output, for display at the display component, a fourth content card from a higher hierarchical level than the current hierarchical level.

Example 9

The wearable computing device of any combination of examples 6-8, wherein, in response to determining, based on the motion data, that the user of the wearable computing device has performed a fifth movement that includes a repeated pronation and supination of the forearm of the user within a period of time, the at least one module is further operable to output, for display at the display component, a home screen.

Example 10

The wearable computing device of any combination of examples 6-9, wherein the home screen is a content card of the list of content cards that is not the next content card, the previous content card, or a currently displayed content card.

Example 11

A computer-readable storage medium storing instructions that, when executed, cause one or more processors of a wearable computing device to: output for display, by a display of a wearable computing device, a content card of a list of content cards; receive motion data generated by a motion sensor of the wearable computing device that represents motion of a forearm of a user of the wearable computing device; responsive to determining, based on the motion data, that the user of the wearable computing device has performed a first movement that includes a supination of the forearm of the user followed by a pronation of the forearm of the user at an acceleration that is less than an acceleration of the supination, output for display, by the display component, a next content card of the list of content cards; and responsive to determining, based on the motion data, that the user of the wearable computing device has performed a second movement that includes a supination of the forearm of the user followed by a pronation of the forearm of the user at an acceleration that is greater than an acceleration of the supination, output for display, by the display component, a previous content card of the list of content cards.

Example 12

The computer-readable storage medium of example 11, wherein the list of content cards is at a current hierarchical level of a plurality of hierarchical levels, the computer-readable storage medium further comprising instructions that cause the one or more processors to: responsive to determining, based on the motion data, that the user of the wearable computing device has performed a third movement that includes a lowering of at least a distal end of the forearm of the user away from a head of the user followed by a raising of at least the distal end of the forearm of the user toward the head of the user, output for display, by the display component, a content card of the list of content cards at a lower hierarchical level of the plurality of hierarchical levels than the current hierarchical level.

Example 13

The computer-readable storage medium of any combination of examples 12-13, further comprising instructions that cause the one or more processors to: responsive to determining, based on the motion data, that the user of the wearable computing device has performed a fourth movement that includes a raising of at least the distal end of the forearm of the user towards the head of the user followed by a lowering of at least the distal end of the forearm of the user away from the head of the user, output for display, by the display component, a content card of a list of content cards at a higher hierarchical level of the plurality of hierarchical levels than the current hierarchical level.

Example 14

The computer-readable storage medium of any combination of examples 12-14, further comprising instructions that cause the one or more processors to: responsive to determining, based on the motion data, that the user of the wearable computing device has performed a fifth movement that includes a repeated pronation and supination of the forearm of the user within a period of time, output for display, by the display component, a home screen.

Example 15

The computer-readable storage medium of any combination of examples 12-15, wherein the home screen is a content card of the list of content cards that is not the next content card, the previous content card, or a currently displayed content card.

Example 16

A method comprising: displaying, by a display of a wearable computing device, a content card of a list of content cards at a current hierarchical level of a plurality of hierarchical levels; receiving, by the wearable computing device, motion data generated by a motion sensor of the wearable computing device that represents motion of a forearm of a user of the wearable computing device; in response to determining, by the wearable computing device and based on the motion data, that the user of the wearable computing device has performed a first movement that includes a lowering of at least a distal end of the forearm of the user away from a head of the user followed by a raising of at least the distal end of the forearm of the user toward the head of the user, displaying, by the display, a content card of the list of content cards at a lower hierarchical level of the plurality of hierarchical levels than the current hierarchical level.

Example 17

The method of example 16, further comprising: in response to determining, by the wearable computing device and based on the motion data, that the user of the wearable computing device has performed a second movement that includes a raising of at least the distal end of the forearm of the user towards the head of the user followed by a lowering of at least the distal end of the forearm of the user away from the head of the user, displaying, by the display, a content card of a list of content cards at a higher hierarchical level of the plurality of hierarchical levels than the current hierarchical level.

Example 18

The method of any combination of examples 16-17, further comprising: in response to determining, by the wearable computing device and based on the motion data, that the user of the wearable computing device has performed a third movement that includes a supination of the forearm of the user followed by a pronation of the forearm of the user at an acceleration that is less than an acceleration of the supination, displaying, by the display, a next content card of the list of content cards.

Example 19

The method of any combination of examples 16-18, further comprising: in response to determining, by the wearable computing device and based on the motion data, that the user of the wearable computing device has performed a fourth movement that includes a supination of the forearm of the user followed by a pronation of the forearm of the user at an acceleration that is greater than an acceleration of the supination, displaying, by the display, a previous content card of the list of content cards.

Example 20

The method of any combination of examples 16-19, further comprising: in response to determining, by the wearable computing device and based on the motion data, that the user of the wearable computing device has performed a fifth movement that includes a repeated pronation and supination of the forearm of the user within a period of time, displaying, by the display, a home screen.

Example 21

A wearable computing device comprising means for performing any combination of the method of examples 1-5 or examples 16-20.

Example 22

A wearable computing device configured to be worn on a forearm of a user, the wearable computing device comprising; a display component that displays content cards; at least one motion sensor that detects movement of the wearable computing device and generates, based on the movement, motion data that represents motion of the forearm of the user of the wearable computing device; one or more processors configured to perform any combination of the method of examples 1-5 or examples 16-20.

Example 23

A computer-readable storage medium comprising instructions that, when executed, cause one or more processors of a wearable computing device to perform any combination of the method of examples 1-5 or examples 16-20.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   displaying, by a display of a wearable computing device, a content card of a list of content cards;
   receiving, by the wearable computing device, motion data generated by a motion sensor of the wearable computing device that represents motion of a forearm of a user of the wearable computing device;
   in response to determining, by the wearable computing device and based on the motion data, that the user of the wearable computing device has performed a first movement that includes a supination of the forearm of the user followed by a pronation of the forearm of the user at an acceleration that is less than an acceleration of the supination, displaying, by the display, a next content card of the list of content cards; and
   in response to determining, by the wearable computing device and based on the motion data, that the user of the wearable computing device has performed a second movement that includes a supination of the forearm of the user followed by a pronation of the forearm of the user at an acceleration that is greater than an acceleration of the supination, displaying, by the display, a previous content card of the list of content cards.

2. The method of claim 1, wherein the list of content cards is at a current hierarchical level of a plurality of hierarchical levels, and wherein the current content card corresponds to a list of content cards at a lower hierarchical level of the plurality of hierarchical levels than the current hierarchical level, the method further comprising:
   in response to determining, by the wearable computing device and based on the motion data, that the user of the wearable computing device has performed a third movement that includes a lowering of at least a distal end of the forearm of the user away from a head of the user followed by a raising of at least the distal end of the forearm of the user toward the head of the user, displaying, by the display, a content card of the list of content cards at the lower hierarchical level.

3. The method of claim 1, further comprising:
   in response to determining, by the wearable computing device and based on the motion data, that the user of the wearable computing device has performed a fourth movement that includes a raising of at least a distal end of the forearm of the user towards the head of the user followed by a lowering of at least the distal end of the forearm of the user away from the head of the user, displaying, by the display, a content card of a list of content cards at a higher hierarchical level of the plurality of hierarchical levels than the current hierarchical level.

4. The method of claim 1, further comprising:
   in response to determining, by the wearable computing device and based on the motion data, that the user of the wearable computing device has performed a fifth movement that includes a repeated pronation and supination of the forearm of the user within a period of time, displaying, by the display, a home screen.

5. The method of claim 4, wherein the home screen is a content card of the list of content cards that is not the next content card, the previous content card, or a currently displayed content card.

6. A wearable computing device configured to be worn on a forearm of a user, the wearable computing device comprising:
   a display component that displays content cards;
   at least one motion sensor that detects movement of the wearable computing device and generates, based on the movement, motion data that represents motion of the forearm of the user of the wearable computing device;
   one or more processors;
   at least one module operable by the one or more processors to:
      cause the display component to display a first content card of a list of content cards;
      responsive to determining that the user of the wearable computing device has performed a first gesture that includes a supination of the forearm of the user followed by a pronation of the forearm of the user at an acceleration that is less than an acceleration of the supination, output, for display by the display component, a second content card of the list of content cards; and
      responsive to determining, based on the motion data, that the user of the wearable computing device has performed a second gesture that includes a supination of the forearm of the user followed by a pronation of the forearm of the user at an acceleration that is greater than an acceleration of the supination, output, for display by the display component, the first content card.

7. The wearable computing device of claim 6, wherein the first content card corresponds to a current hierarchical level of a plurality of hierarchical levels, and wherein, responsive to determining, based on the motion data, that the user of the wearable computing device has performed a third movement that includes a lowering of at least a distal end of the forearm of the user away from a head of the user followed by a raising of at least the distal end of the forearm of the user toward the head of the user, the at least one module is further operable to output, for display by the display component, a third content card from a lower hierarchical level than the current hierarchical level.

8. The wearable computing device of claim 6, wherein, in response to determining, based on the motion data, that the user of the wearable computing device has performed a fourth movement that includes a raising of at least a distal end of the forearm of the user towards the head of the user followed by a lowering of at least the distal end of the forearm of the user away from the head of the user, the at least one module is further operable to output, for display at the display component, a fourth content card from a higher hierarchical level than the current hierarchical level.

9. The wearable computing device of claim 6, wherein, in response to determining, based on the motion data, that the user of the wearable computing device has performed a fifth movement that includes a repeated pronation and supination of the forearm of the user within a period of time, the at least one module is further operable to output, for display at the display component, a home screen.

10. The wearable computing device of claim 9, wherein the home screen is a content card of the list of content cards that is not the next content card, the previous content card, or a currently displayed content card.

11. A non-transitory computer-readable storage medium storing instructions that, when executed, cause one or more processors of a wearable computing device to:
output for display, by a display of a wearable computing device, a content card of a list of content cards;
receive motion data generated by a motion sensor of the wearable computing device that represents motion of a forearm of a user of the wearable computing device;
responsive to determining, based on the motion data, that the user of the wearable computing device has performed a first movement that includes a supination of the forearm of the user followed by a pronation of the forearm of the user at an acceleration that is less than an acceleration of the supination, output for display, by the display component, a next content card of the list of content cards; and
responsive to determining, based on the motion data, that the user of the wearable computing device has performed a second movement that includes a supination of the forearm of the user followed by a pronation of the forearm of the user at an acceleration that is greater than an acceleration of the supination, output for display, by the display component, a previous content card of the list of content cards.

12. The non-transitory computer-readable storage medium of claim 11, wherein the list of content cards is at a current hierarchical level of a plurality of hierarchical levels, the computer-readable storage medium further comprising instructions that cause the one or more processors to:
responsive to determining, based on the motion data, that the user of the wearable computing device has performed a third movement that includes a lowering of at least a distal end of the forearm of the user away from a head of the user followed by a raising of at least the distal end of the forearm of the user toward the head of the user, output for display, by the display component, a content card of the list of content cards at a lower hierarchical level of the plurality of hierarchical levels than the current hierarchical level.

13. The non-transitory computer-readable storage medium of claim 11, further comprising instructions that cause the one or more processors to:
responsive to determining, based on the motion data, that the user of the wearable computing device has performed a fourth movement that includes a raising of at least the distal end of the forearm of the user towards the head of the user followed by a lowering of at least the distal end of the forearm of the user away from the head of the user, output for display, by the display component, a content card of a list of content cards at a higher hierarchical level of the plurality of hierarchical levels than the current hierarchical level.

14. The non-transitory computer-readable storage medium of claim 11, further comprising instructions that cause the one or more processors to:
responsive to determining, based on the motion data, that the user of the wearable computing device has performed a fifth movement that includes a repeated pronation and supination of the forearm of the user within a period of time, output for display, by the display component, a home screen.

15. The non-transitory computer-readable storage medium of claim 14, wherein the home screen is a content card of the list of content cards that is not the next content card, the previous content card, or a currently displayed content card.

16. A method comprising:
displaying, by a display of a wearable computing device, a content card of a list of content cards at a current hierarchical level of a plurality of hierarchical levels;
receiving, by the wearable computing device, motion data generated by a motion sensor of the wearable computing device that represents motion of a forearm of a user of the wearable computing device;
in response to determining, by the wearable computing device and based on the motion data, that the user of the wearable computing device has performed a first movement that includes a lowering of at least a distal end of the forearm of the user away from a head of the user followed by a raising of at least the distal end of the forearm of the user toward the head of the user, displaying, by the display, a content card of the list of content cards at a lower hierarchical level of the plurality of hierarchical levels than the current hierarchical level; and
in response to determining, by the wearable computing device and based on the motion data, that the user of the wearable computing device has performed a second movement that includes a supination of the forearm of the user followed by a pronation of the forearm of the user at an acceleration that is greater than an acceleration of the supination, displaying, by the display, a previous content card of the list of content cards.

17. The method of claim 16, further comprising:
in response to determining, by the wearable computing device and based on the motion data, that the user of the wearable computing device has performed a third movement that includes a raising of at least the distal end of the forearm of the user towards the head of the user followed by a lowering of at least the distal end of the forearm of the user away from the head of the user, displaying, by the display, a content card of a list of content cards at a higher hierarchical level of the plurality of hierarchical levels than the current hierarchical level.

18. The method of claim 16, further comprising:
in response to determining, by the wearable computing device and based on the motion data, that the user of the wearable computing device has performed a fourth movement that includes a supination of the forearm of the user followed by a pronation of the forearm of the user at an acceleration that is less than an acceleration of the supination, displaying, by the display, a next content card of the list of content cards.

19. The method of claim 16, further comprising:
in response to determining, by the wearable computing device and based on the motion data, that the user of the wearable computing device has performed a fifth movement that includes a repeated pronation and supination of the forearm of the user within a period of time, displaying, by the display, a home screen.

\* \* \* \* \*